United States Patent
Drahos et al.

(10) Patent No.: US 10,207,943 B2
(45) Date of Patent: Feb. 19, 2019

(54) METHODS, COMPOSITIONS AND SYSTEMS FOR CONTROLLING FOULING OF A MEMBRANE

(71) Applicant: Novozymes Biologicals, Inc., Salem, VA (US)

(72) Inventors: David Drahos, Roanoke, VA (US); Svend Petersen, Lyngby (DK)

(73) Assignee: Novozymes Biologicals, Inc., Salem, VA (US)

(*) Notice: Subject to any disclaimer, the term of this patent is extended or adjusted under 35 U.S.C. 154(b) by 0 days.

(21) Appl. No.: 15/389,056

(22) Filed: Dec. 22, 2016

(65) Prior Publication Data

US 2017/0107130 A1 Apr. 20, 2017

Related U.S. Application Data

(63) Continuation of application No. 12/942,610, filed on Nov. 9, 2010, now abandoned.

(60) Provisional application No. 61/369,801, filed on Aug. 2, 2010, provisional application No. 61/259,936, filed on Nov. 10, 2009.

(51) Int. Cl.
  *C02F 3/28* (2006.01)
  *C02F 3/12* (2006.01)
  *C02F 3/34* (2006.01)

(52) U.S. Cl.
  CPC .......... *C02F 3/2853* (2013.01); *C02F 3/1268* (2013.01); *C02F 3/34* (2013.01); *C02F 2303/20* (2013.01); *Y02W 10/15* (2015.05)

(58) Field of Classification Search
  None
  See application file for complete search history.

(56) References Cited

U.S. PATENT DOCUMENTS

| | | |
|---|---|---|
| 6,162,634 A | 12/2000 | Lawler |
| 6,777,223 B2 | 8/2004 | Xu |
| 2003/0173275 A1 | 9/2003 | Arnaud |
| 2005/0115892 A1 | 6/2005 | Fleury |
| 2007/0248381 A1 | 10/2007 | Akioka |
| 2008/0233093 A1 | 9/2008 | McHatton |
| 2008/0248558 A1 | 10/2008 | Deinhammer |
| 2009/0188860 A1 | 7/2009 | Hofmann-Kamesky |
| 2011/0024355 A1 | 2/2011 | Mansouri |

FOREIGN PATENT DOCUMENTS

| | | |
|---|---|---|
| CN | 1699216 A | 11/2005 |
| CN | 101229938 A | 7/2008 |
| CN | 101264424 A | 9/2008 |
| CN | 101559429 A | 10/2009 |
| DE | 102006005585 A1 | 6/2007 |
| JP | 2005046657 | 2/2005 |
| JP | 2007-75754 A | 3/2007 |
| JP | 2011016126 A | 1/2011 |
| KR | 20040072392 A | 8/2004 |

(Continued)

OTHER PUBLICATIONS

Malaeb et al, 2013, Water research 47, 5447-5463.

(Continued)

*Primary Examiner* — David W Berke-Schlessel
(74) *Attorney, Agent, or Firm* — Eric J. Fechter

(57) ABSTRACT

The present invention provides methods and compositions for improving permeability and flux in a membrane filtration system, especially in water or wastewater treatment processes.

10 Claims, 4 Drawing Sheets

Specification includes a Sequence Listing.

(56) References Cited

FOREIGN PATENT DOCUMENTS

| WO | 03/076340 A2 | 9/2003 |
| WO | 2008/118749 A2 | 10/2008 |

OTHER PUBLICATIONS

ATCC Catalogue Bacteria & Bacteriophages 18th Edition (1992).
Boyer et al., FEMS Microbiol. Ecol., vol. 70, pp. 1-19 (2009).
Donlon et al., Healthcare Epidemiology, vol. 33, pp. 1387-1392 (2001).
Fane, "Factors affecting the membrane performance in MBR's", School of Civil & Environmental Engineering, Nanyang Technological University, Singapore, agfane@ntu.edu.sg UNESCO Centre for Membrane Science & Technology, University of New South Wales, Sydney, NSW, 2052, Australia, a.fane@unsw.edu.au (date unknown).
Jinsong et al., "Effect of microbial community and behavior on membrane biofouling Intensity in submerged membrane bioreactor", Abstracts/Journal of Biotechnology, vol. 136S, p. S624 (2008).
Kolodkin-Gal et al., "D-Amino Acids Trigger Biofilm Disassembly", Science, vol. 328, pp. 627-629 (2010).
Koseoglu et al, Journal of Membrane Science, vol. 320, pp. 57-64 (2008).
Le-Clech et al., "Fouling in membrane bioreactors used in wastewater treatment", UNESCO Centre for Membrane Science and Technology, School of Chemical Engineering, the University of New South Wales, Sydney 2052, NSW, Australia (date unknown).
Lou et al., "Triggering biofilm breakdown", Science Business Exchange, pp. 1-2 (2010).
Meng et al., "Recent advances in membrane bioreactors (MBRs): Membrane fouling and membrane material", (Water Research, vol. 43, pp. 1489-1512 (2009).
Treatment Equipment Co., "MBR System Evaluation Overview" (date unknown).
Vagner et al., "A vector for systematic gene inactivation in Bacillus subtilis", Microbiology, vol. 144, pp. 3097-3104 (1998).
Wei et al., China Water and Wastewater, vol. 24, No. 17, pp. 64-69 (2008).
Yeon et al, "Quorum Sensing: A New Biofouling Control Paradigm in a Membrane Bioreactor for Advanced Wastewater Treatment", Environ. Sci. Technol., vol. 43, pp. 380-385 (2009).
Yoon et al., "A novel flux enhancing method for membrane bioreactor (MBR) process using polymer", Desalination, vol. 191, pp. 52-61 (2006).
Pang et al, 2003, Journal of Tianjin University, vol. 36, No. 3), pp. 383-386.
Yang et al, 2005, Membrane Science and Technology, vol. 25, No. 2, pp. 80-84.

METHODS, COMPOSITIONS AND SYSTEMS FOR CONTROLLING FOULING OF A MEMBRANE

CROSS-REFERENCE TO RELATED APPLICATIONS

This application is a continuation of U.S. application Ser. No. 12/942,610 filed on Nov. 9, 2010, now pending, which claims the benefit under 35 U.S.C. 119 of U.S. provisional application Nos. 61/259,936 and 61/369,801 filed Nov. 10, 2009 and Aug. 2, 2010, respectively. The content of each application is fully incorporated herein by reference.

REFERENCE TO A SEQUENCE LISTING

This application contains a Sequence Listing in computer readable form, which is incorporated herein by reference.

FIELD OF THE INVENTION

The present invention provides methods and compositions for improving permeability and flux in a membrane filtration system, especially in water or wastewater treatment processes.

BACKGROUND OF THE INVENTION

Membrane bioreactor (MBR) systems are becoming an increasingly popular solution for water and wastewater treatment. Although membrane systems for water treatment and purification have been in use for decades, the employment of MBR systems as a widespread solution for water and wastewater treatment has generally been disregarded in favor of more conventional biotreatment plants. One significant reason for such disregard is that MBR systems are often comparatively more expensive than conventional treatment systems. However, the higher purity of the product and the decreased footprint make the employment of MBR systems desirable.

MBR systems typically include one or more biological reactors, such as anaerobic, anoxic and aerobic reactors, followed by one or more membrane tanks with each tank containing one or more membrane modules. Water or wastewater is induced into the membrane modules by gravity feed or suction created by a pump. During the process, the membranes filter out contaminants and other solids and a permeate is produced.

One major drawback to membrane filtration processes is membranes tend to foul. As the membranes foul, the permeability of the membranes decrease, and the effectiveness of the whole process is reduced. It is generally understood that the rate of membrane fouling is increased roughly exponentially with an increase in the flux. Study of this phenomenon has lead to the theory of critical flux. Although critical flux is described in a number of ways, the general definition of critical flux is the flux below which permeability decline is considered negligible. Therefore, controlling the flux, preferably maintaining it at or below the critical flux, reduces the rate of permeability decline and provides sustainable operation of membrane systems.

Even if a membrane system is run at or below the critical flux rate, membrane fouling still occurs and methods of cleaning the membranes must be employed. In membrane systems such as MBRs, air scouring is often utilized to continually clean the membranes and help sustain permeation. Air scouring creates turbulence and shear force at the surface of the membrane to help reduce fouling and cake layer buildup. However, air scouring significantly increases operating costs and is not completely effective at maintaining adequate critical flux rates.

Other physico-mechanical and/or chemical membrane cleaning or treatment methods are used to remove fouling material and maintain membrane permeability. Most widely used physico-mechanical methods include backwashing, vibration, and air-scouring. These methods are energy-intensive and not applicable to all membrane types.

Chemical cleaning or treatment methods include pretreatment with coagulants and/or polymers, and treatment with antiscalants, biocides, and/or cleaning products such as NaOCl or citric acid. Mineral or organic acids, caustic soda, or sodium hypochlorite are also often used in chemical cleaning methods. However, frequent chemical cleaning is costly due to the loss in system operation time, decreased life expectancy of the membranes, and large consumption of cleaning chemicals.

Physical cleaning methods such as air scouring are most effective at removing gross solids from the membranes, the substances that cause fouling sometimes referred to as "temporary" or "reversible" fouling. Chemical cleaning methods are effective at removing more tenacious fouling substances, the substances that cause fouling sometimes referred to as "irreversible" or "permanent" fouling. However, chemical cleaning cannot remove all permanent or irreversible fouling substances and residual resistance of the membrane remains. This residual resistance or "irrecoverable" fouling is the fouling that builds up on the membrane over a number of years and ultimately limits the lifetime of the membrane.

Combinations of the mentioned methods are also commonly used, such as chemically enhanced backwashing, often as a daily cleaning measure. Weekly cleaning measures may include cleaning with higher chemical concentration, and less often regular cleaning may include even more intensive chemical cleaning with a significant negative effect on membrane lifespan.

The mechanisms of membrane fouling have been studied extensively. Fouling occurs over time and often in various stages depending upon flux rate and consistency, as well as the composition of the substance being passed through the membrane. The stages of fouling are sometimes described as initial fouling (or conditioning fouling), steady fouling, and transmembrane pressure (TMP) jump. Initial fouling is believed to be a result of colloid adsorption, small particulates blocking the membrane pores, and small flocs or extracellular polymeric substances (EPS) left from temporary attachment of biological aggregates to the membrane. The overall resistance change by this initial fouling often has only a negligible effect on flux and TMP once active filtration occurs. However, initial fouling is believed to play a bigger role in providing a favorable matrix for further or steady fouling. The steady fouling stage includes further pore blocking by particulate matter, but is also disadvantageous due to increased cake formation and biofilm growth on the membranes. This stage of fouling does not always occur homogeneously across the membrane, but steady fouling increases TMP and decreases permeability, resulting in a decrease in flux. The final stage of fouling is referred to as TMP jump where permeation lessens significantly in a relatively short period of time. There are a number of theories postulating the mechanisms that cause TMP jump. However, regardless of the mechanism, once TMP jump occurs, the membrane is so significantly fouled that it often is ineffective for use in the process.

Other process parameters can affect membrane flux. One example is the temperature that the process is run at. Generally, an increase in process temperature results in an increased flux rate. This flux improvement with higher temperature may be due to a decrease in permeate viscosity, and may decrease the rate of fouling. However, controlling the temperature of the water or wastewater treatment process is typically not feasible and would be cost prohibitive.

Solutions to reduce or prevent membrane fouling have targeted all types and stages of fouling. Particularly, targeting biofilm formation has been of recent interest. For example, Yeon et al., 2009, *Environ. Sci. Technol.* 43: 380-385 discuss targeting the quorum sensing (QS)-based membrane fouling mechanism of organisms that are involved in steady fouling.

U.S. Patent Application Publication No. 2008/0233093 discloses a small number of strains of the genus *Bacillus* that can reduce and/or prevent biofilm formation and/or planktonic proliferation when co-cultured with certain undesirable microorganisms.

Due to the critical need for effective water and wastewater treatment, solutions that decrease membrane fouling and/or increase critical flux rates in membrane applications including MBR systems are highly desirable.

SUMMARY OF THE INVENTION

In one aspect, the present invention provides a method of improving permeability or flux of a membrane used in a process, comprising subjecting the membrane to one or more microorganisms capable of reducing or preventing the development of undesirable biofilm on the membrane.

In another aspect, the present invention provides a method of increasing the critical flux of a membrane used in a process, comprising subjecting the membrane to one or more microorganisms capable of reducing or preventing the development of undesirable biofilm on the membrane.

In another aspect, the present invention provides a method of reducing or preventing fouling of a membrane used in a process, comprising subjecting the membrane to one or more microorganisms capable of reducing or preventing the development of undesirable biofilm on the membrane.

In another aspect, the present invention provides a composition comprising one or more cultures of microorganisms capable of reducing or preventing the development of undesirable biofilm on the membrane.

DETAILED DESCRIPTION OF THE INVENTION

Figure 1:
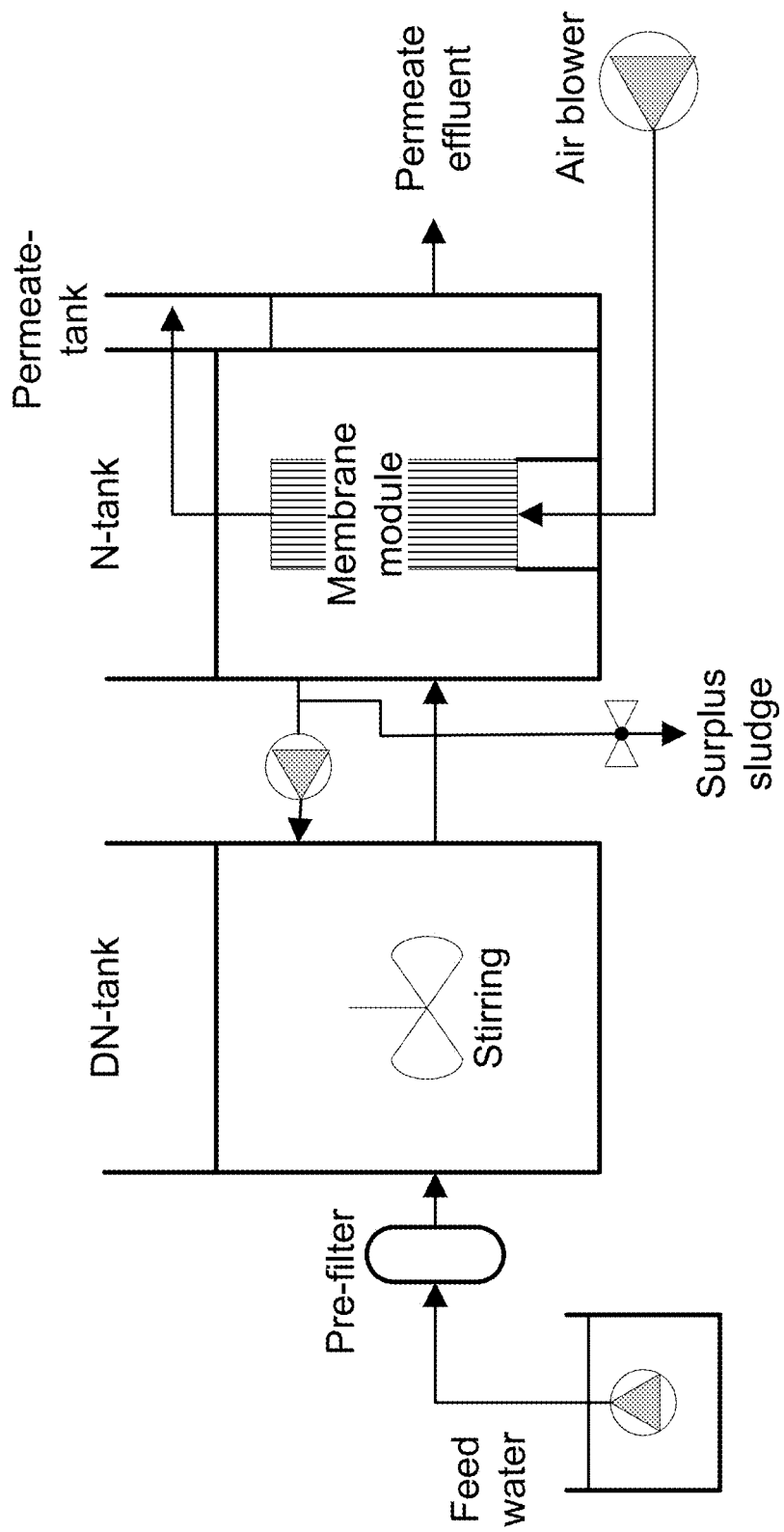
FIG. 1 is a schematic illustration of the layout of the MBR pilot plant.

The present invention relates to methods of and compositions for improving permeability and flux in a membrane filtration system as well as methods and compositions for reducing and/or preventing fouling of membranes in water and wastewater treatment processes.

Fouling of membranes occurs by many mechanisms and at differing rates due to a number of process variables in the filtration systems as well as the content of the water or wastewater being treated. One commonality of membrane fouling, however, is that microorganisms from the water or wastewater create biofilms on the membranes during the fouling process, and as a result, TMP increases and permeability or flux decreases. The relationship between the rate of fouling of a membrane and the rate of flux through a membrane are known to be inversely correlative. Thus, the theory of "critical flux" or the maximum flux rate at which fouling can be reduced or slowed has been developed. However, maintaining the flux at or below the critical flux does not prevent fouling from occurring. Such fouling eventually increases the TMP and decreases the flux so much that the membranes must be cleaned in order to maintain effectiveness of the filtration process. The ability to raise the critical flux is advantageous in a membrane system. Increased flux improves capacity of an existing system, enables lower investment requirements for new systems due to smaller dimensioning, and/or increases operational efficiency and flexibility since a larger volume of water or wastewater can be treated before the membranes have to be cleaned, and the overall lifespan of the membrane may be increased. Plant investments costs, as well as the cost of cleaning and replacing the membranes, are high, and the loss of productivity during the cleaning process results in lost operation time and revenue. Therefore, methods that can allow more water or wastewater to be treated per area of membrane and/or methods that allow more water or wastewater to be treated between membrane cleanings and or increase the lifespan of the membranes are financially advantageous.

Surprisingly, addition of certain microorganisms to a membrane filtration system allows the system to maintain or even increase flux rates. The microorganisms employed in the present invention adhere to the membranes in the same or similar fashion as the microorganisms that create the undesirable biofilm formation do. However, the use of the microorganisms according to the method of the present invention surprisingly does not have a negative effect on permeability and may even improve flux (e.g., increase the critical flux) as compared to permeability or flux through an untreated membrane in the same process over the same period of time.

Permeability of a membrane or flux through a membrane generally declines over a period of time during a process that employs the membrane. It is generally accepted that this decline is due to membrane fouling. According to the present invention, "improving permeability" or "improving flux" means that the membrane permeability or flux is the same or declines less over a certain period of time during a process as compared to a same or similar membrane during the same process without applying a bacterial strain over the same certain period of time at the same conditions such as flow rate, temperature, and pressure.

In an embodiment, the method of reducing and/or preventing of fouling of membranes in water treatment processes comprising subjecting the membranes to one or more bacterial strains capable of reducing or preventing undesirable biofilm formation on the membrane, wherein the bacterial strain is of the genus *Bacillus*.

In an embodiment a blend of bacteria may be used according to the method of the invention. Examples of blends can be found below in the section "Bacterial Strains and Blends of Bacterial Strains" section below.

The term "biofilm" or "biofilm formation" as used herein means the slime layer or film or the formation of a slime layer or film by undesired microorganisms on a membrane. Biofilm formation is a consequence of growth of undesired microorganisms which attach singly or in colonies to a membrane.

The invention also relates to a method of improving permeability or flux of a membrane used in a process, comprising subjecting the membrane to one or more microorganisms capable of reducing or preventing undesirable biofilm formation on the membrane. These novel microbes may cause no direct impact on the health or viability of these undesirable strains, but only compete against them in developing a biofilm on the membrane surface. As used herein, "subjecting" means applying the one or more bacterial strains to the water and/or membrane, such as, e.g., by introducing, innoculating dispensing, applying, treating the water to be treated and/or directly the membrane to be treated with the one or more microorganisms or bacterial strains recited herein for use in the present invention in reducing or preventing undesirable biofilm formation on the membrane. Subjecting also includes intentionally biasing the microbial content of the water and/or membrane to contain an effective amount of the desire microorganism. Such biasing can be achieved by introducing, innoculating dispensing, applying, treating the water to be treated and/or directly the membrane to be treated with the one or more microorganisms or bacterial strains recited herein or any other method effective to obtain the desired microorganism population in the water and the membrane to be treated.

In one embodiment, the present invention provides a method of increasing critical flux of a membrane used in a process, comprising subjecting the membrane to one or more microorganisms capable of reducing or preventing undesirable biofilm formation on the membrane.

In another embodiment, the present invention provides a method of reducing or preventing fouling of a membrane used in a process, comprising subjecting the membrane to one or more microorganisms capable of reducing or preventing undesirable biofilm formation on the membrane.

Microorganisms, Bacterial Strains, and Blends of Microorganisms and Bacterial Strains It is to be understood that the microorganism or bacterial strain used in accordance with methods of the invention reduces or prevents undesirable biofilm formation on membranes. In order to determine if a microorganism or bacterial strain reduces or prevents undesirable biofilm formation on membranes, a comparison is made with *Pseudomonas aeruginosa* PAO1 (ATCC 47085). In particular, a microorganism or bacterial strain is useful in the compositions and methods of the present invention if the strain reduces or prevents undesirable biofilm formation on membranes compared with the biofilm formation caused by *Pseudomonas aeruginosa* PAO1 (ATCC 47085), as measured by flux reduction, as described in Example 1. The microorganism or bacterial strain may be a culture of a strain. Preferred properties for the microorganisms or bacterial strains include, for example, one or more of the following properties: minimal output of extracellular polymeric substances (EPS), low biocake formation tendencies, and low mucoidal substance release, and preferably, the microorganisms or bacterial strains include all of these properties.

In one embodiment, the microorganism is a spore forming microorganism. In another embodiment, the microorganism is a spore forming bacteria. In yet another embodiment, the microorganism is in the form of a stable spore. In yet another embodiment, the microorganism is the form of a stable bacterial spore. As used herein, "stable" is a term that is known in the art and in a preferred aspect stable is used in the present invention to mean the ability of the microorganism to remain in a spore form until it is applied in the present invention to reduce or prevent undesirable biofilm formation on the membrane.

In an embodiment, the bacterial strain is a gram-positive bacterial strain.

In an embodiment, a bacterial strain for use in the present invention is a strain of *Agrobacterium* spp., e.g., *Agrobacterium atlanticum*; *Agrobacterium rubi*; *Agrobacterium tumefaciens*; or *Agrobacterium vitis*, and combinations thereof.

In another embodiment, a bacterial strain for use in the present invention is a strain of *Arthrobacter* spp., e.g., *Arthrobacter oxydans*; *Arthrobacter aurescens*; *Arthrobacter globiformis*; *Arthrobacter ramosus*; or *Arthrobacter viscosus*, and combinations thereof.

In another embodiment, a bacterial strain for use in the present invention is a strain of *Bacillus* spp., e.g., *Bacillus amyloliquefaciens*; *Bacillus atrophaeus*; *Bacillus azotoformans*; *Bacillus brevis*; *Bacillus cereus*; *Bacillus circulans*; *Bacillus clausii*; *Bacillus coagulans*; *Bacillus firmus*; *Bacillus flexus*; *Bacillus fusiformis*; *Bacillus globisporus*; *Bacillus glucanolyticus*; *Bacillus infermus*; *Bacillus laevolacticus*; *Bacillus licheniformis*; *Bacillus marinus*; *Bacillus megaterium*; *Bacillus mojavensis*; *Bacillus mycoides*; *Bacillus pallidus*; *Bacillus parabrevis*; *Bacillus pasteurii*; *Bacillus polymyxa*; *Bacillus popiliae*; *Bacillus pumilus*; *Bacillus sphaericus*; *Bacillus subtilis*; *Bacillus thermoamylovorans*; or *Bacillus thuringiensis*, and combinations thereof.

In another embodiment, a bacterial strain for use in the present invention is a strain of *Bacteriodes* spp., e.g., *Bacteriodes cellulosolvens*; *Bacteriodes galacturonicus*; *Bacteriodes pectinophilus*; or *Bacteriodes vulgates*, and combinations thereof.

In another embodiment, a bacterial strain for use in the present invention is a strain of *Beggiatoa* spp., e.g., *Beggiatoa alba*, and combinations thereof.

In another embodiment, a bacterial strain for use in the present invention is a strain of *Beijerinckia* spp., e.g., *Beijerinckia derxia*; *Beijerinckia fluminensis*; *Beijerinckia indica*; or *Beijerinckia mobilis*, and combinations thereof.

In another embodiment, a bacterial strain for use in the present invention is a strain of *Bifidobacterium* spp., e.g., *Bifidobacterium animalis*; *Bifidobacterium inducum*; *Bifidobacterium magnum*; *Bifidobacterium minimum*; or *Bifidobacterium subtile*, and combinations thereof.

In another embodiment, a bacterial strain for use in the present invention is a strain of *Brachybacterium* spp., e.g., *Brachybacterium alimentarium*; *Brachybacterium nesterenkovii*; or *Brachybacterium rhamnosum*, and combinations thereof.

In another embodiment, a bacterial strain for use in the present invention is a strain of *Bradyrhizobium* spp., e.g., *Bradyrhizobium elkanii*; *Bradyrhizobium japonicum*; or *Bradyrhizobium liaoningense*, and combinations thereof.

In another embodiment, a bacterial strain for use in the present invention is a strain of *Brevibacillus* spp., e.g., *Brevibacillus brevis*; *Brevibacillus formosus*; *Brevibacillus laterosporus*; or *Brevibacillus parabrevis*, and combinations thereof.

In another embodiment, a bacterial strain for use in the present invention is a strain of *Burkholderia* spp., e.g., *Burkholderia andropogonis*; *Burkholderia sacchari*; or *Burkholderia vandii*, and combinations thereof.

In another embodiment, a bacterial strain for use in the present invention is a strain of *Carnobacterium* spp., e.g., *Carnobacterium divergens*; *Carnobacterium funditum*; *Carnobacterium mobile*; or *Carnobacterium pleistocenium*, and combinations thereof.

In another embodiment, a bacterial strain for use in the present invention is a strain of *Caulobacter* spp., e.g., *Caulobacter bacteriodes*; *Caulobacter fusiformis*; *Caulobacter variabilis*; or *Caulobacter viriodoes*, and combinations thereof.

In another embodiment, a bacterial strain for use in the present invention is a strain of *Cellulomonas* spp., e.g., *Cellulomonas humilata* or *Cellulomonas xylanilitica*, and combinations thereof.

In another embodiment, a bacterial strain for use in the present invention is a strain of *Citrobacter* spp., e.g., *Citrobacter amalonaticus*; *Citrobacter koseri*; or *Citrobacter freundii*, and combinations thereof.

In another embodiment, a bacterial strain for use in the present invention is a strain of *Corynebacerium* spp., e.g., *Corynebacterium flavescens* or *Corynebacterium glutamicum*, and combinations thereof.

In another embodiment, a bacterial strain for use in the present invention is a strain of *Enterobacter* spp., e.g., *Enterobacter cloacae*; *Enterobacter dissolvens*; *Enterobacter gergoviae*; *Enterobacter nimipressuralis*; or *Enterobacter pyrinus*, and combinations thereof.

In another embodiment, a bacterial strain for use in the present invention is a strain of *Escherichia* spp., e.g., *Escherichia albertii*; *Escherichia blattae*; *Escherichia coli*; *Escherichia fergusonii*; *Escherichia hermannii*; or *Escherichia vluneris*, and combinations thereof.

In another embodiment, a bacterial strain for use in the present invention is a strain of *Erwinia* spp., e.g., *Erwinia amylovora* or *Erwinia caratovora*, and combinations thereof.

In another embodiment, a bacterial strain for use in the present invention is a strain of *Flavobacterium* spp., e.g., *Flavobacterium acidurans* or *Flavobacterium resinovorum*, and combinations thereof.

In another embodiment, a bacterial strain for use in the present invention is a strain of *Gluconoabacter* spp., e.g., *Gluconobacter oxidans*, and combinations thereof.

In another embodiment, a bacterial strain for use in the present invention is a strain of *Halomonas* spp., e.g., *Halomonas elongate* or *Halomonas salinas*, and combinations thereof.

In another embodiment, a bacterial strain for use in the present invention is a strain of *Hyphomicrobium* spp., e.g., *Hyphomicrobium facilis* or *Hyphomicrobium indicum*, and combinations thereof.

In another embodiment, a bacterial strain for use in the present invention is a strain of *Lactobacillus* spp., e.g., *Lactobacillus casei*; *Lactobacillus helveticus*; *Lactobacillus johnsonii*; or *Lactobacillus paracasei*, and combinations thereof.

In another embodiment, a bacterial strain for use in the present invention is a strain of *Lactococcus* spp., e.g., *Lactococcus lacti*, and combinations thereof.

In another embodiment, a bacterial strain for use in the present invention is a strain of *Leuconostoc* spp., e.g., *Leuconostoc citreum* or *Leuconostoc mesenteroides*, and combinations thereof.

In another embodiment, a bacterial strain for use in the present invention is a strain of *Lysobacter* spp., e.g., *Lysobacter antibioticus*; *Lysobacter brunescens*; or *Lysobacter enzymogenes*, and combinations thereof.

In another embodiment, a bacterial strain for use in the present invention is a strain of *Methylobacterium* spp., e.g., *Methylobacterium organophilum* or *Methylobacterium rhodesianum*, and combinations thereof.

In another embodiment, a bacterial strain for use in the present invention is a strain of *Microbacterium* spp., e.g., *Microbacterium laevaniformans* and combinations thereof.

In another embodiment, a bacterial strain for use in the present invention is a strain of *Myxococcus* spp., e.g., *Myxococcus fulvus* or *Myxococcus xanthus*, and combinations thereof.

In another embodiment, a bacterial strain for use in the present invention is a strain of *Nocardiodes* spp., e.g., *Nocardiodes oleivorans* and combinations thereof.

In another embodiment, a bacterial strain for use in the present invention is a strain of *Oceanospirillum* spp., e.g., *Oceanospirillum linum* and combinations thereof.

In another embodiment, a bacterial strain for use in the present invention is a strain of *Pediococcus* spp., e.g., *Pediococcus acidilactici* or *Pediococcus pentosaceus* and combinations thereof.

In another embodiment, a bacterial strain for use in the present invention is a strain of *Photobacterium* spp., e.g., *Photobacterium damsela* or *Photobacterium phosphoreum* and combinations thereof.

In another embodiment, a bacterial strain for use in the present invention is a strain of *Planctomyces* spp., e.g., *Planctomyces brasiliensis* or *Planctomyces maris* and combinations thereof.

In another embodiment, a bacterial strain for use in the present invention is a strain of *Polyangium* spp., e.g., *Polyangium cellulosum* and combinations thereof.

In another embodiment, a bacterial strain for use in the present invention is a strain of *Pseudoalteromonas* spp., e.g., *Pseudoalteromonas atlantica* or *Pseudoalteromonas nigrifaciens* and combinations thereof.

In another embodiment, a bacterial strain for use in the present invention is a strain of *Pseudonorcardia* spp., e.g., *Pseudonorcardia autotrophic* and combinations thereof.

In another embodiment, a bacterial strain for use in the present invention is a strain of *Paenibacillus* spp., e.g., *Paenibacillus alvei*; *Paenibacillus amylolyticus*; *Paenibacillus azotofixans*; *Paenibacillus cookii*; *Paenibacillus macerans*; *Paenibacillus polymyxa*; or *Paenibacillus validus*, and combinations thereof.

In another embodiment, a bacterial strain for use in the present invention is a strain of *Paracoccus* spp., e.g., *Paracoccus alcaliphilus*; *Paracoccus denitrificans*; *Paracoccus kocurii*; or *Paracoccus pantotrophus*, and combinations thereof.

In another embodiment, a bacterial strain for use in the present invention is a strain of *Pseudomonas* spp., e.g., *Pseudomonas anitmiicrobica*; *Pseudomonas aureofaciens*; *Pseudomonas chlororaphis*; *Pseudomonas corrugata*; *Pseudomonas fluorescens*; *Pseudomonas marginalis*; *Pseudomonas nitroreducens*; or *Pseudomonas putida*, and combinations thereof.

In another embodiment, a bacterial strain for use in the present invention is a strain of *Rhodococcus* spp., e.g., *Rhodococcus coprophilus*; *Rhodococcus erythropolis*; *Rhodococcus marinonascens*; *Rhodococcus rhodochrous*; *Rhodococcus ruber*, or *Rhodococcus zopfii*, and combinations thereof.

In another embodiment, a bacterial strain for use in the present invention is a strain of *Rhodospirillum* spp., e.g., *Rhodospirillum rubrum* and combinations thereof.

In another embodiment, a bacterial strain for use in the present invention is a strain of *Salmonella* spp., e.g., *Salmonella bongori*; or *Salmonella enterica*, and combinations thereof.

In another embodiment, a bacterial strain for use in the present invention is a strain of *Sphingomonas* spp., e.g., *Sphingomonas adhaesiva*, and combinations thereof.

In another embodiment, a bacterial strain for use in the present invention is a strain of *Stackebrandtia* spp., e.g., *Stackebrandtia nassauensis*, and combinations thereof.

In another embodiment, a bacterial strain for use in the present invention is a strain of *Streptomyces* spp., e.g., *Streptomyces aureofaciens* or *Streptomyces griseus*, and combinations thereof.

In another embodiment, a bacterial strain for use in the present invention is a strain of *Thiobacillus* spp., e.g., *Thiobacillus halophilus* or *Thiobacillus thioparus*, and combinations thereof.

In another embodiment, a bacterial strain for use in the present invention is a strain of *Vibrio* spp., e.g., *Vibrio fischeri* or *Vibrio logei*, and combinations thereof.

In another embodiment, a fungal strain for use in the present invention is a strain of *Penicillium* spp., e.g., *Penicillium aurantiogriseum*; *Penicillium bilaiae*; *Penicillium camemberti*; *Penicillium candidum*; *Penicillium chrysogenum*; *Penicillium claviforme*; *Penicillium commune*; *Penicillium crustosum*; *Penicillium digitatum*; *Penicillium expansum*; *Penicillium funiculosum*; *Penicillium glabrum*; *Penicillium glacum*; *Penicillium italicum*; *Penicillium lacussarmientei*; *Penicillium marneffei*; *Penicillium purpurogenum*; *Penicillium roqueforti*; *Penicillium stoloniferum*; *Penicillium ulaiense*; *Penicillium verrucosum*; or *Penicillium viridicatum*, and combinations thereof.

In another embodiment, a microorganism for use in the present invention is a strain of *Agrobacterium* spp., e.g., *Agrobacterium atlanticum*; *Agrobacterium rubi*; *Agrobacterium tumefaciens*; or *Agrobacterium vitis*, *Arthrobacter* spp., e.g., *Arthrobacter oxydans*; *Arthrobacter aurescens*; *Arthrobacter globiformis*; *Arthrobacter ramosus*; or *Arthrobacter viscosus*, *Bacillus* spp., e.g., *Bacillus amyloliquefaciens*; *Bacillus atrophaeus*; *Bacillus azotoformans*; *Bacillus brevis*; *Bacillus cereus*; *Bacillus circulans*; *Bacillus clausii*; *Bacillus coagulans*; *Bacillus firmus*; *Bacillus flexus*; *Bacillus fusiformis*; *Bacillus globisporus*; *Bacillus glucanolyticus*; *Bacillus infermus*; *Bacillus laevolacticus*; *Bacillus licheniformis*; *Bacillus marinus*; *Bacillus megaterium*; *Bacillus mojavensis*; *Bacillus mycoides*; *Bacillus pallidus*; *Bacillus parabrevis*; *Bacillus pasteurii*; *Bacillus polymyxa*; *Bacillus popiliae*; *Bacillus pumilus*; *Bacillus sphaericus*; *Bacillus subtilis*; *Bacillus thermoamylovorans*; or *Bacillus thuringiensis*, *Bacteriodes* spp., e.g., *Bacteriodes cellulosolvens*; *Bacteriodes galacturonicus*; *Bacteriodes pectinophilus*; or *Bacteriodes vulgates*, *Beggiatoa* spp., e.g., *Beggiatoa alba*, *Beijerinckia* spp., e.g., *Beijerinckia derxia*; *Beijerinckia fluminensis*; *Beijerinckia indica*; or *Beijerinckia mobilis*, *Bifidobacterium* spp., e.g., *Bifidobacterium animalis*; *Bifidobacterium inducum*; *Bifidobacterium magnum*; *Bifidobacterium minimum*; or *Bifidobacterium subtile*, *Brachybacterium* spp., e.g., *Brachybacterium alimentarium*; *Brachybacterium nesterenkovii*; or *Brachybacterium rhamnosum*, *Bradyrhizobium* spp., e.g., *Bradyrhizobium elkanii*; *Bradyrhizobium japonicum*; or *Bradyrhizobium liaoningense*, *Brevibacillus* spp., e.g., *Brevibacillus brevis*; *Brevibacillus formosus*; *Brevibacillus laterosporus*; or *Brevibacillus parabrevis*, *Burkholderia* spp., e.g., *Burkholderia andropogonis*; *Burkholderia sacchari*; or *Burkholderia vandii*, *Carnobacterium* spp., e.g., *Carnobacterium divergens*; *Carnobacterium funditum*; *Carnobacterium mobile*; or *Carnobacterium pleistocenium*, *Caulobacter* spp., e.g., *Caulobacter bacteriodes*; *Caulobacter fusiformis*; *Caulobacter variabilis*; or *Caulobacter viriodoes*, *Cellulomonas* spp., e.g., *Cellulomonas humilata* or *Cellulomonas xylanilitica*, *Citrobacter* spp., e.g., *Citrobacter amalonaticus*; *Citrobacter koseri*; or *Citrobacter freundii*, *Corynebacerium* spp., e.g., *Corynebacterium flavescens* or *Corynebacterium glutamicum*, *Enterobacter* spp., e.g., *Enterobacter cloacae*; *Enterobacter dissolvens*; *Enterobacter gergoviae*; *Enterobacter nimipressuralis*; or *Enterobacter pyrinus*, *Escherichia* spp., e.g., *Escherichia albertii*; *Escherichia blattae*; *Escherichia coli*; *Escherichia fergusonii*; *Escherichia hermannii*; or *Escherichia vluneris* *Erwinia* spp., e.g., *Erwinia amylovora* or *Erwinia caratovora*, *Flavobacterium* spp., e.g., *Flavobacterium acidurans* or *Flavobacterium resinovorum*, *Gluconoabacter* spp., e.g., *Gluconobacter oxidans*, *Halomonas* spp., e.g., *Halomonas elongate* or *Halomonas salinas*, *Hyphomicrobium* spp., e.g., *Hyphomicrobium facilis* or *Hyphomicrobium indicum*, *Lactobacillus* spp., e.g., *Lactobacillus casei*; *Lactobacillus helveticus*; *Lactobacillus johnsonii*; or *Lactobacillus paracasei*, *Lactococcus* spp., e.g., *Lactococcus lacti*, *Leuconostoc* spp., e.g., *Leuconostoc citreum* or *Leuconostoc mesenteroides*, *Lysobacter* spp., e.g., *Lysobacter antibioticus*; *Lysobacter brunescens*; or *Lysobacter enzymogenes*, *Methylobacterium* spp., e.g., *Methylobacterium organophilum* or *Methylobacterium rhodesianum*, *Microbacterium* spp., e.g., *Microbacterium laevaniformans*, *Myxococcus* spp., e.g., *Myxococcus fulvus* or *Myxococcus xanthus*, *Nocardiodes* spp., e.g., *Nocardiodes oleivorans*, *Oceanospirillum* spp., e.g., *Oceanospirillum linum*, *Pediococcus* spp., e.g., *Pediococcus acidilactici* or *Pediococcus pentosaceus*, *Photobacterium* spp., e.g., *Photobacterium damsela* or *Photobacterium phosphoreum*, *Planctomyces* spp., e.g., *Planctomyces brasiliensis* or *Planctomyces marls*, *Polyangium* spp., e.g., *Polyangium cellulosum*, *Pseudoalteromonas* spp., e.g., *Pseudoalteromonas atlantica* or *Pseudoalteromonas nigrifaciens*, *Pseudonorcardia* spp., e.g., *Pseudonorcardia autotrophic*, *Paenibacillus* spp., e.g., *Paenibacillus alvei*; *Paenibacillus amylolyticus*; *Paenibacillus azotofixans*; *Paenibacillus cookii*; *Paenibacillus macerans*; *Paenibacillus polymyxa*; or *Paenibacillus validus*, *Paracoccus* spp., e.g., *Paracoccus alcaliphilus*; *Paracoccus denitrificans*; *Paracoccus kocurii*; or *Paracoccus pantotrophus*, *Pseudomonas* spp., e.g., *Pseudomonas anitmiicrobica*; *Pseudomonas aureofaciens*; *Pseudomonas chlororaphis*; *Pseudomonas corrugata*; *Pseudomonas fluorescens*; *Pseudomonas marginalis*; *Pseudomonas nitroreducens*; or *Pseudomonas putida*, *Rhodococcus* spp., e.g., *Rhodococcus coprophilus*; *Rhodococcus erythropolis*; *Rhodococcus marinonascens*; *Rhodococcus rhodochrous*; *Rhodococcus ruber*, or *Rhodococcus zopfii*, *Rhodospirillum* spp., e.g., *Rhodospirillum rubrum*, *Salmonella* spp., e.g., *Salmonella bongori*; or *Salmonella enterica*, *Sphingomonas* spp., e.g., *Sphingomonas adhaesiva*, *Stackebrandtia* spp., e.g., *Stackebrandtia nassauensis*, *Streptomyces* spp., e.g., *Streptomyces aureofaciens* or *Streptomyces griseus*, *Thiobacillus* spp., e.g., *Thiobacillus halophilus* or *Thiobacillus thioparus*, *Vibrio* spp., e.g., *Vibrio fischeri* or *Vibrio logei*, and *Penicillium* spp., e.g., *Penicillium aurantiogriseum*; *Penicillium bilaiae*; *Penicillium cambert*; *Penicillium candidum*; *Penicillium chrysogenum*; *Penicillium claviforme*; *Penicillium commune*; *Penicillium crustosum*; *Penicillium digitatum*; *Penicillium expansum*; *Penicillium funiculosum*; *Penicillium glabrum*; *Penicillium glacum*; *Penicillium italicum*; *Penicillium lacussarmientei*; *Penicillium mameffei*; *Penicillium pur-*

*purogenum; Penicillium roqueforti; Penicillium stoloniferum; Penicillium ulaiense; Penicillium verrucosum;* or *Penicillium viridicatum*, and combinations thereof.

In an embodiment, the one or more bacterial strains are selected from the group consisting of:

the *Bacillus megaterium* strain having the deposit accession number ATCC 14581;

the *Bacillus pumilus* strain having the deposit accession number ATCC 700385;

the *Paenibacillus azotofixans* strain having the deposit accession number ATCC 35681;

the *Bacillus licheniformis* strain having the deposit accession number NRRL B-50014;

the *Bacillus licheniformis* strain having the deposit accession number NRRL B-50015;

the *Bacillus pumilus* strain having the deposit accession number NRRL B-50016;

the *Bacillus amyloliquefaciens* strain having the deposit accession number NRRL B-50017;

the *Bacillus amyloliquefaciens* strain having the deposit accession number NRRL B-50018;

the *Bacillus amyloliquefaciens* strain having the deposit accession number NRRL B-50136;

the *Bacillus amyloliquefaciens* strain having the deposit accession number NRRL B-50141;

the *Bacillus amyloliquefaciens* strain having the deposit accession number NRRL B-50304;

the *Bacillus amyloliquefaciens* strain having the deposit accession number NRRL B-50349;

the *Bacillus megaterium* strain having the deposit accession number PTA-3142;

the *Bacillus amyloliquefaciens* strain having the deposit accession number PTA-7541;

the *Bacillus amyloliquefaciens* strain having the deposit accession number PTA-7542;

the *Bacillus atrophaeus* strain having the deposit accession number PTA-7543;

the *Bacillus amyloliquefaciens* strain having the deposit accession number PTA-7544;

the *Bacillus amyloliquefaciens* strain having the deposit accession number PTA-7545;

the *Bacillus amyloliquefaciens* strain having the deposit accession number PTA-7546;

the *Bacillus subtilis* strain having the deposit accession number PTA-7547;

the *Bacillus amyloliquefaciens* strain having the deposit accession number PTA-7549;

the *Bacillus amyloliquefaciens* strain having the deposit accession number PTA-7790;

the *Bacillus amyloliquefaciens* strain having the deposit accession number PTA-7791;

the *Bacillus atrophaeus* strain having the deposit accession number PTA-7792; and the *Bacillus amyloliquefaciens* strain having the deposit accession number PTA-7793; or a mixture of at least two of the above deposited strains, including more than two, such as, at least three of the above strains, at least four of the above strains, at least five of the above strains, at least six of the above strains, at least seven of the above strains, up to an including all of the above strains.

The terms "effective amount", "effective concentration" or "effective dosage" are defined herein as the amount, concentration or dosage of one or more bacterial strains that can reduce and/or prevent biofilm formation caused by undesired microorganisms on a membrane. The actual effective dosage in absolute numbers depends on factors including: the undesired microorganism(s) in question; whether the aim 1s prevention or reduction; the contact time between the strain(s) or composition comprising said strain(s); other ingredients present, and also the membrane in question. In an embodiment an effective dosage of bacteria, e.g., of the strain NRRL B-50017, would be introduced to the membrane surface at a final concentration of $1\times10^4$-$1\times10^{11}$ $CFU/cm^2$, with a preferred range of $1\times10^6$-$1\times10^7$ $CFU/cm^2$. Typically this would result in the introduction of these bacterial strains in the membrane-containing vessel of $1\times10^3$-$1\times10^{10}$ CFU/ml, with a preferred range of $1\times10^5$-$1\times10^6$ CFU/ml.

The "effective amount", "effective concentration" or "effective dosage" is ultimately achieved by subjecting the water and/or membrane to the one or more microorganisms described herein for use in reducing and/or preventing biofilm formation, as described herein.

In general, environments that receive high loads of undesirable microorganisms and nutrients require high doses of mitigating bacterial strains, while environments with low loads of undesirable organisms require lower doses of mitigating bacterial strains. Further, for instance, preventing biofilm formation on membranes, in general, require lower doses of the concerned bacterial strain(s) than reducing biofilm formation on the corresponding membrane.

Consequently, a method of the invention can be used for inhibiting growth (i.e., leading to reduced biofilm formation) of one or more undesired microorganisms, preferably bacteria already present on a membrane or surface. In another embodiment the invention relates to preventing and/or significantly retarding biofilm formation on an essentially clean membrane (i.e., membrane with essentially no undesired microorganisms). In other words, the concerned bacterial strain(s) protect(s) the membrane against future growth of one or more undesired microorganisms. A method of the invention may result in the reduction of undesired microorganisms. The concerned bacterial strain(s) may in a preferred embodiment be applied to the membrane in question. Periodically means that the method of the invention may be reiterated or repeated over a period of time, e.g., every minute, hour, day, week, month, etc. As mentioned above, the effect may not last for a long period of time. It may require redosing of the bacterial strain(s).

According to the invention, the bacterial strains can be introduced to the membrane before the membrane is employed in the process, immediately following cleaning of the membrane after it has been employed in the process, at any time during the process, or any combination thereof.

Undesired Microorganisms

In the context of the invention the term "undesired microorganisms" means microorganisms that may result in an effect considered to be negative on the membrane in question. For example, the negative effect may be fouling of the membrane by such undesired microorganisms. Undesired microorganisms can also include pathogenic microorganisms, especially pathogenic bacteria. In order to determine if a bacterial strain is undesirable, a comparison is made with *Pseudomonas aeruginosa* PAO1 (ATCC 47085). In particular, a bacterial strain is undesirable and cannot be used in the compositions and methods of the present invention if the strain causes fouling of the membrane (as measured by flux reduction, in accordance with Example 1). In another embodiment, a bacterial strain is undesirable and cannot be used in the compositions and methods of the present invention if the strain causes fouling of the membrane (as measured by flux reduction, in accordance with Example 1) at least as much as *Pseudomonas aeruginosa* PAO1 (ATCC 47085). A bacterial strain is also undesirable if the bacterial strain does not reduce fouling caused by *Pseudomonas aeruginosa* PAO1 (ATCC 47085). Thus, different strains of the same species may have opposite effects on the flux.

By using one or more of the isolated bacterial strains concerned herein in an effective amount, biofilm formation on membranes can be reduced and/or prevented.

In a preferred embodiment the membrane in question prone to biofilm formation may be subjected to one or more of the bacterial strains as a preventative measure prior to any biofilm formation/buildup. This results in the formation of significantly less biofilm or in the formation of a biofilm which is significantly less conducive to membrane fouling.

Examples of undesired microorganisms include those disclosed below.

Undesired microorganisms include, but are not limited to, aerobic bacteria or anaerobic bacteria, gram-positive and gram-negative bacteria, fungi (yeast or filamentous fungus), algae, and/or protozoa. Undesirable bacteria include bacteria selected from the group consisting of *Acetobacter, Aeromonas, Azotobacter vinelandii, Betabacterium, Burkholderia, Clostridium botulinum, Corynebacterium diphteriae, Escherichia coli, Flavobacterium, Leuconostoc, Legionella* spp., *Listeria* spp., *Mycobacterium tuberculosis, Pneumococcus, Pseudomonas* spp., including *Pseudomonas aeruginosa, Salmonella, Staphylococcus, Streptococcus* spp., and *Vibrio* spp.

In one embodiment, the undesired microorganism is an aerobic bacterium. In another embodiment, the aerobic bacterium is an *Aeromonas* strain. In another embodiment, the aerobic bacterium is a *Burkholderia* strain. In another embodiment, the aerobic bacterium is a *Flavobacterium* strain. In another embodiment, the aerobic bacterium is a *Microbacterium* strain. In another embodiment, the aerobic bacterium is a *Pseudomonas* strain. In another embodiment, the aerobic bacterium is a *Salmonella* strain. In another embodiment, the aerobic bacterium is a *Staphylococcus* strain. In another embodiment, the aerobic bacterium is from the family Enterobacteriaceae (including, e.g., *Escherichia coli*).

In another embodiment, the aerobic bacterium is *Burkholderia cepacia*. In another embodiment, the aerobic bacterium is a *Microbacterium imperiale* or *Mycobacterium tuberculosis*. In another embodiment, the aerobic bacterium is *Pseudomonas aeruginosa*. In another embodiment, the aerobic bacterium is *Pseudomonas fluorescens*. In another embodiment, the aerobic bacterium is *Pseudomonas oleovorans*. In another embodiment, the aerobic bacterium is *Pseudomonas pseudoalcaligenes*. In another embodiment, the aerobic bacterium is *Salmonella enteritidis*. In another embodiment, the aerobic bacterium is *Staphylococcus aureus*. In another embodiment, the aerobic bacterium is *Staphylococcus epidermidis*.

In another embodiment the bacterium is *Listeria monocytogenes*.

In another embodiment the bacterium is *Legionella adelaidensis*. In another embodiment the bacterium is *Legionella pneumophila*. In another embodiment the bacterium is *Legionella feeleii*. In another embodiment the bacterium is *Legionella moravica*.

In another embodiment the bacteria is *Vibrio harveyi, Vibrio fischerii,* and/or *Vibrio alginolyticus*.

In another embodiment, the microorganism is an anaerobic bacterium. In another embodiment, the anaerobic bacterium is a *Desulfovibrio* strain. In another embodiment, the anaerobic bacterium is *Desulfovibrio desulfuricans*.

Quorum Sensing and Other Microbial Signaling Mechanisms

Quorum sensing is a mechanism that allows bacteria to "communicate" and affect phenotypic aspects of the bacterial population such as pigmentation, motility, pathogenicity and biofilm formation. Quorum sensing is believed to be achieved through secretion of small signaling molecules called autoinducers. Quenching or inactivating these autoinducers can prevent biofilm formation of undesirable microorganisms. Thus, quorum sensing inhibition is a mode of action for biofilm control. In one embodiment, the bacterial strains of the present invention prevent membrane fouling by preventing biofilm formation by quorum sensing inhibition. In another embodiment, the quorum sensing inhibition is through the inhibition of acyl homoserine lactone (AHL) inhibition. In another embodiment, the quorum sensing inhibition is due to acylase activity of the microorganim(s). In another embodiment, the quorum sensing inhibition is due to lactonase activity of the microorganism(s). In another embodiment, the quorum sensing inhibition is due to racemase activity of the microorganism(s).

Another embodiment of the present invention includes a method of screening microorganisms for use in the methods and compositions of the present invention based on the ability of the bacteria to prevent bioflim formation by quorum sensing inhibition. In another embodiment of the present invention, the quorum sensing inhibition is through the inhibition of acyl homoserine lactone inhibition (AHL). In yet another embodiment, of the present invention, the quorum sensing inhibition is due to acylase activity of the microorganism(s). The quorum sensing may be effective achieved due to the action of one microorganism or a combination of microorganisms.

Membranes

A variety of membrane types and configurations can be used in water or wastewater treatment processes. Types of membrane configurations include capillary tube, tubular, hollow fiber, multi-tube, plat-and-frame/flat sheet, pleated cartridge filter, spiral wound, and ceramic including ceramic disc. Membranes can be made from one or more materials including, for example, chlorinated polyethylene, polyacrylonitrile, polysulfone, polyethersulfone, polyvinylalcohol, cellulose acetate, regenerated cellulose, polyvinylidene difluoride, polyethlysulphone, polyethylene, polypropylene, and ceramic material. Other characteristics of the membranes that can vary based on the application include, for example, the membrane pore size. The size of the membrane pores may be larger or smaller depending upon the size of particulate or impurity being removed from the water or wastewater. Membrane types, according to the present invention, include those utilized for ultrafiltration, microfiltration, and nanofiltration.

Membrane Bioreactor Systems

Membrane bioreactor (MBR) systems typically combine two basic processes: biological degradation and membrane separation, into a single process where suspended solids and microorganisms responsible for biodegradation are separated from the treated water by a membrane filtration unit. See, for example, *Water Treatment Membrane Processes*, McGraw-Hill, 1996, p. 17.2. The entire biomass is confined within the system, providing for both control of the residence time for the microorganisms in the reactor (sludge age) and the disinfection of the effluent.

In a typical MBR unit, influent wastewater is pumped or gravity fed into an aeration tank where it is brought into contact with the biomass which biodegrades organic material in the wastewater. Aeration means such as blowers provide oxygen to the biomass. The resulting mixed liquor is pumped or gravity fed from the aeration tank into the membrane module where it is mechanically or gravitationally filtered through a membrane under pressure or is drawn through a membrane under low vacuum. In some systems, the aeration tank and the membrane tank are the same tank. The effluent is discharged from the system while the concentrated mixed liquor is returned to the bioreactor. Excess sludge is pumped out in order to maintain a constant sludge age, and the membrane is regularly cleaned by backwashing, chemical washing, air scouring, or any combination of these mechanisms.

MBR systems have multiple configurations. Two main MBR process configurations include submerged/immersed and sidestream. There are also two primary mechanisms of hydraulic operation including pumping and airlifting. These configurations and bulk liquid transfer modes are typically referred to as conventional biomass rejection MBRs. Other configurations include extractive and diffusive process modes which employ membranes for purposes other than separating biomass from the treated water. All of these process configurations include one or more membrane units comprising membranes such as those described in the "Membranes" section above.

In one embodiment, the membranes are present in a membrane bioreactor. In another embodiment, the wastewater treatment process occurs in a membrane bioreactor in which the membrane flat-sheet cassette unit, or hollow-fiber unit, itself is typically immersed.

In one embodiment, the wastewater is pretreated prior to entering the membrane bioreactor. Pretreatment can occur at the source of the wastewater, at a pretreatment plant, or as part of the overall MBR system. Such pretreatments can include a bar screen, grit chamber, or rotary drum screen to achieve coarse solids removal. Other pretreatments may include removal of substances such as harmful pollutants, oils or fuels, or other toxic substances.

Water Treatment Processes

One or more water treatment processes are contemplated by the present invention. Such water treatment processes include, but are not limited to, reverse osmosis, water desalination and drinking water purification, and wastewater treatment processes. The water or wastewater, according to the present invention, can be from any source including human waste, cesspit leakage, septic tank discharge, sewage plant discharge, washing water such as greywater or sullage, collected rainwater, groundwater, surplus manufactured liquids, seawater, river water, manmade liquid disposal, highway drainage, storm drains, blackwater, industrial waste, industrial site wastewater or drainage such as cooling or process waters, and agricultural wastewater or drainage.

Compositions of the Invention

The invention also relates to a composition comprising one or more of the microorganisms, including deposited strains, as described herein. It is to be understood that a composition of the invention may comprise one or more of the bacterial strains concerned herein as single strains or blends of two or more strains and further comprises one or more additional ingredients mentioned below.

The invention also relates to a composition comprising one or more microorganisms or one or more of the bacterial strains, including deposited strains, as described herein in a form suitable for application to a water treatment process and/or membrane, such as, in a form and in an effective amount for reducing or preventing undesirable biofilm formation on the membrane. The microorganisms are preferably in the form of stable spores.

Additional Ingredients

The composition may comprise one or more additional ingredients and/or enzymes. Examples of contemplated enzymes are mentioned in the "Enzymes" section below.

Other ingredients may be active ingredients that also reduce or prevent biofilm formation or inactive ingredients and include, but are not limited to, cis-2-decanoic acid, dispersants, stabilizers, fragrances, dyes, and biocides. The other ingredients can be made via traditional chemistry or biologically, such as the case may be.

Enzymes

One or more enzymes may be present in a composition of the invention. For example, the composition may comprise an acylase and/or lactonase. In one embodiment, the enzyme(s) are from a fungal or bacterial source. In another embodiment, the enzyme(s) may also be produced "in situ" by one or more of the bacterial strains of the present invention that have been genetically modified to express such enzyme(s). In another embodiment, the enzyme(s) are native to the bacterial strains of the present invention and may be naturally expressed or the bacterial strain(s) may be genetically modified to alter the level of expression of the naturally occurring enzyme(s).

EXAMPLES

Example 1

Method for Screening Candidate Strains Capable of Reducing or Preventing Anti-Fouling in MBR Systems Candidate strains were grown and cultured over an approximately 16 hour period subject to shaking at 25° C. in 1× Lysogeny Broth (10 g Tryptone; 5 g yeast extract; 1 g NaCl, and deionized water to 1 liter). Candidate strains were then counted using a hemocytometer and then serial diluted to a concentration of $1\times10^3$ cells/ml. Each well of a PVDF (poly(vinylidene fluoride))-bottomed 96-well plate (Millipore® no: MSGVS2210) was filled with 100 microliters sterile 0.1× Lysogeny Broth. 100 microliters of the diluted candidate strains were added to the well. Those wells not including the addition of candidate strains were filled with 100 microliters sterile 1× Lysogeny broth. The 96-well plate was sealed with Breathe Easy® plate sealing film and placed on a plate shaker for approximately 16 hours at 25° C.

*Pseudomonas aeruginosa* PAO1 was selected as a biofilm-forming strain and grown and cultured over an approximately 16 hour period subject to shaking at 200 rpm in 1× Lysogeny Broth (10 g Tryptone; 5 g yeast extract; 1 g NaCl, and deionized water to 1 liter) at 25° C. *P. aeruginosa* cultures were counted using a hemocytometer and then serial diluted to a concentration of $1\times10^3$ cells/ml.

Following culture of the biofilm-forming strain, the Breathe Easy® plate sealing film was removed from the 96-well plate and 100 microliters of the diluted bio-film forming strain, *P. aeruginosa*, was added to the wells containing candidate strains. Those wells not including the addition of biofilm-forming strains were filled with 100 microliters sterile 1× Lysogeny broth. The 96-well plate was re-sealed with a new Breathe Easy® plate sealing film and placed on a plate shaker at 200 rpm for a 24 hour period at 25° C.

After 24 hours the Breathe Easy® plate sealing film was removed from the 96-well plate. 10 microliters were removed from each well and placed into the corresponding well of a new sterile 96-well plate for plating or optical density measurements at 590 nm. An additional 990 microliters of phosphate buffered saline solution (PBS) was added to each well to bring the volume of each well to approximately 1 ml. The 96-well plate was then inverted onto a Wypall* (Kimberly-Clark) for removing any planktonic cells and then excess media was removed using a pipettor. Each well was subsequently rinsed with 250 microliters of PBS and then inverted for a second time onto a Wypall* (Kimberly-Clark). Remaining PBS was removed using a pipettor then 250 µl of 0.25% Brilliant Green Dye in PBS was added to each well. The 96-well plate was then placed on top of a Millipore vacuum manifold (Millipore no: MSVMHTS00) over a 96-well clear bottomed collection plate. The vacuum was applied to the 96-well plate at −0.5 bar for 2 mins. The vacuum was powered off and the 96-well collection plate was recovered for flow-through evaluation.

Specifically, the 96-well collection plate was placed on a plate reader (BioTek Synergy HT) and the absorbance of each well was measured at λ=610 nm ($Abs_{610}$). The volume of flow-through collected in each well was determined by applying the equation $V = Abs_{610} \times 88.997 + 15.334$ where V=the volume of 0.25% brilliant green in a well. This equation was derived by measuring the $A_{610}$ of 0.25% Brilliant Green in a 96 well plate and plotting this against the known volumes in each well. Wells having a higher absorbance had a higher volume than those wells with a lower absorbance. Accordingly, those wells with high absorbance were selected as containing likely candidate strains capable of reducing or preventing biofilm formation.

Results of the 96-well screening method are found in Table 1. 38 strains belonging to 16 genera within 11 families have been tested for their ability to protect flux through a PVDF membrane in the presence of a biofilm forming *Pseudomonas aeruginosa* strain, PAO1, using a 96-well based method. A strain is considered a candidate strain if it is capable of maintaining ≥25% of the flow allowed by a sterile, uninoculated PVDF membrane of the same size under the same conditions. The results show that a phylogeneticaly broad range of bacteria and a fungus (*Penicillium* sp) are capable of transmembrane flux maintenance in the presence of biological fouling agents.

TABLE 1

| Family | Strain (genus, species) | Number | % Protection |
|---|---|---|---|
| Acetobacteraceae | *Gluconacetobacter diazatrophicus* | SB3779 (DSMZ 5601) | 16.14 |
| Bacillaceae | *Bacillus megaterium* | SB3112 (PTA-3142) | 20.22 |
| Bacillaceae | *Bacillus licheniformis* | SB3181 (NRRL B-50015) | 4.87 |
| Bacillaceae | *Bacillus pumilus* | SB3182 (NRRL B-50016) | 19.35 |
| Bacillaceae | *Bacillus amyloliquefaciens* | SB3448 (PTA-7791) | 16.63 |
| Bacillaceae | *Bacillus pumilus* | SB3002 (ATCC 700385) | 7.81 |
| Bacillaceae | *Bacillus megaterium* | SB3059 (ATCC 14581) | 6.74 |
| Bacillaceae | *Bacillus subtilis* | SB3086 (NRRL B-50136) | 31.52 |
| Bacillaceae | *Bacillus megaterium* | SB3112 (PTA-3142) | 12.96 |
| Bacillaceae | *Bacillus licheniformis* | SB3131 (ATCC 12713) | 12.96 |
| Bacillaceae | *Bacillus amyloliquefaciens* | SB3195 (NRRL B-50017) | 15.02 |
| Bacillaceae | *Bacillus subtilis* | SB3259 | 7.79 |

TABLE 1-continued

| Family | Strain (genus, species) | Number | % Protection |
|---|---|---|---|
| Bacillaceae | *Bacillus amyloliquefaciens* | SB3615 (NRRL B-50349) | 31.15 |
| Bacillaceae | *Bacillus subtilis* | SB3223 (A164) (ATCC 6051A) | 12.67 |
| Burkholderiaceae | *Burkholderia* sp | GW5 | 19.37 |
| Corynebacteriaceae | *Corynebacterium mucifaciens* | C.muc (ATCC 700355) | 10.75 |
| Corynebacteriaceae | *Corynebacterium diphtheriae* | C. dip (ATCC 11913) | 12.51 |
| Corynebacteriaceae | *Corynebacterium xanthophilus* | C.xp10 (ATCC 373) | −0.17 |
| Enterobacteriaceae | *Citrobacter* sp | SB3257 | 25.82 |
| Enterobacteriaceae | *Enterobacter cloacae* | SB3255 | 34.63 |
| Enterobacteriaceae | *Enterobacter gergoviae* | SB3258 | 26.02 |
| Enterobacteriaceae | *Enterobacter cloacae* | SB3103 (ATCC 31482) | −10.99 |
| Enterobacteriaceae | *Enterobacter disolvens* | SB3013 (NRRL B-50257) | −2.35 |
| Enterobacteriaceae | *Eschericia coli* | SB3254 | 53.17 |
| Enterobacteriaceae | *Salmonella enterica* | SAL (ATCC 167) | 40.02 |
| Nocardiaceae | *Rhodococcus etythropolis* | 5B3100 | 16.79 |
| Paenibacillaceae | *Brevibacillus epidermidis* | Brevi (ATCC 35514) | 3.78 |
| Paenibacillaceae | *Brevibacillus parabrevis* | SB3187 (ATCC 10068) | 25.06 |
| Paenibacillaceae | *Paenibacillus azotofixans* | SB3054 (ATCC 35681) | 38.09 |
| Paenibacillaceae | *Paenibacillus validus* | SB3263 | 36.14 |
| Pseudomonodaceae | *Pseudomonas aeruginosa* | SB3088 | 4.43 |
| Pseudomonodaceae | *Pseudomonas aeruginosa* | SB3259 | 26.04 |
| Pseudomonodaceae | *Pseudomonas monteilii* | BL44 | 9.28 |
| Rhodospirillaceae | *Azospirillum* sp | SB3772 | 10.20 |
| Sphingobacteriaceae | *Mucilaginibacter* sp | GW6 | 43.74 |
| Staphylococcaceae | *Staphylococcus epidermidis* | Staph (ATCC 14990) | 10.11 |
| Trichocomaceae | *Penicillium* sp | Peni1 | 35.18 |

Example 2

Lab Scale MBR Model (PVDF)

Lab-scale MBR systems were prepared using 0.5× Lysogeny Broth (5 g Tryptone; 2.5 g yeast extract; 0.5 g NaCl, and deionized water to 1 liter) flowing via gravity feed into an Amicon 8200 stirred cell ultrafiltration unit (Millipore, Billerica, Mass., USA) fitted with a 63.5 mm diameter (28.7 $cm^2$ effective area) PVDF membrane that had been treated with 95% isopropanol prior to use followed by sterilization with 10% perchlorate. The filtration devices were inoculated with spores of strains of interest at a rate of $2 \times 10^6$ cfu/$cm^2$ and incubated for 24 hours at 25° C. with constant stirring at approximately 125 rpm and a flow rate of 8.5 ml/hr/$cm^2$. A control unit was prepared similarly but was not inoculated with a strain of interest. After 24 hours incubation, the units were inoculated with $2 \times 10^4$ cfu/$cm^2$ *Pseudomonas aeruginosa* strain PAO1, a known biofilm forming organism and the flow-through rates of all concurrently running filter units were adjusted to approximately 8 ml/hr/$cm^2$. The filter units continued to run under the above conditions for a further 50 hours. Flow rates through the membrane were determined at regular intervals by measuring the volume of effluent discharge from each of the filter units over a 5 minute period. At the conclusion of the experiment, the filter unit was aseptically disassembled and viable counts were performed on both the media portion and 0.18 $cm^2$ portions of the membrane to determine the cell density of both the strain of interest and the *Pseudomonas aeruginosa* strain.

The measurement at the 48 hour timepoint ($F_{48}$) was taken as the best indication point for flow comparison.

$(F_0-F_{48})*100/F_0$=% decrease in flow

The strains of interest and the flow rates obtained are provided in Table 2.

TABLE 2

| Strain (genus, species) | Number | Flow decrease at 48 hours | % Protection |
| --- | --- | --- | --- |
| *Pseudomonas aeruginosa* | PAO1 (ATCC 47085) | 52% | 0% |
| *Bacillus amyloliquefaciens* | SB3195 (NRRL B-50141) | 10% | 81% |
| *Bacillus amyloliquefaciens* | SB3232 | 20% | 62% |
| *Bacillus amyloliquefaciens* | SB3615 (NRRL B-50349) | 26% | 50% |
| *Bacillus subtilis* | SB3086 (NRRL B-50136) | 9% | 83% |
| *Bacillus subtilis* | SB3223 (A164) (ATCC 6051A) | 19% | 63% |
| *Bacillus megaterium* | SB3112 (PTA-3142) | 21% | 60% |
| *Bacillus megaterium* | SB3059 (ATCC 14581) | 50% | 1% |
| *Bacillus pumilus* | SB3002 (ATCC 700385) | 48% | 2% |
| *Bacillus subtilis* | SB3295 (PTA-7547) | 26% | 50% |
| *Paenibacillus azotofixans* | SB3054 (ATCC 35681) | 24% | 54% |
| *Brevibacillus parabrevis* | SB3187 (ATCC 10068) | 26% | 50% |
| *Rhodococcus etythropolis* | SB3100 | 18% | 65% |

The results show that many of the strains significantly improved the flow rate through the membrane.

Example 3

Lab Scale MBR Model (PES)

A lab-scale MBR experiment was constructed similar to that described in Example 2 utilizing a polyethersulfone (PES) membrane as opposed to the PVDF membrane. MBR units were inoculated as in Example 2 with either NRRL B-50141 or NRRL B-50136. A control unit was prepared similarly but was not inoculated with a strain of interest. Filter units were allowed to operate for 50 hours under the conditions specified in Example 2 and flow rates through the membrane were determined at regular intervals by measuring the volume of effluent discharge from each of the filter units over a 5 minute period. The measurement at the 48 hour timepoint ($F_{48}$) was taken as the best indication point for flow comparison.

$(F_0-F_{48})*100/F_0$=% decrease in flow

The efficacy of strains NRRL B-50141 and NRRL B-50136 at maintaining flow rates through a PES membrane was determined and is provided in Table 3.

TABLE 3

| Strain (Genus, species) | Number | Flow decrease at 48 hours | % Protection |
| --- | --- | --- | --- |
| *Pseudomonas aeruginosa* | PAO1 (ATCC 47085) | 62% | 0% |
| *Bacillus amyloliquefaciens* | SB3195 (NRRL B-50141) | 25% | 40% |
| *Bacillus subtilis* | SB3086 (NRRL B-50136) | 29% | 38% |

The results show that strains NRRL B-50141 and NRRL B-50136 significantly improved the flow rate through the PES membrane.

Example 4

Pilot Scale Test of *Bacillus amyloliquefaciens* NRRL B-50141. MBR Membrane Colonization and Flux Effect With Microbial Inoculation and With Recycling of Inoculum Water Prior to Operation.

The setup of the MBR system utilized in this example is described in FIG. 1.

The MBR system had a total PVDF membrane surface area of 20 m$^2$ and was run for a total of 241 days. The interval from day 110 through day 150 is considered the reference period. Several cleaning events using sodium hypochlorite (500 ppm Cl$_2$) were employed to chemically decrease the biofouling and raise the permeability. The cleaning on day 89 resulted in a permeability rate of 300 l/m$^2$/hr/bar which persisted during the reference period until day 150. This permeability rate is the rate that is typically observed at this treatment plant under these conditions. The membrane was then once again cleaned by the method described above, and subsequently inoculated with a spore suspension of *Bacillus amyloliquefaciens*, NRRL B-50141. The spore inoculum (NRRL B-50141) was prepared at approximately 10% (w/w) blend of the NRRL B-50141 spray-dried spore concentrate with dendritic salt (NaCl). The final concentration of NRRL B-50141 was 4.11×10$^{10}$ CFU/g. The inoculum was distributed in 20 g aliquots into sterile blue-cap conical tubes (50 ml size) for shipment and application.

The inoculant was prepared by adding 20 g inoculum into approximately 400 ml water. The mixture was shaken by hand for approximately 1 minute, dispersing the spores in the water. The shaken mixture was poured into a large bucket with approximately 10-15 liters of water and stirred to blend. The entire contents of the bucket were gradually poured into a 4600 liter aeration tank over the top of the membrane holder, covering the surface area relatively evenly. Prior to addition of the inoculum, the conditions of the MBR system were as follows: water temperature 25° C., pH 7.6, oxygen tension 5.8 mg/l and water flow 900 l/h. Following the addition of the inoculum, the conditions of the MBR system were as follows: water temperature 25° C., pH 7.35, oxygen tension 0.7 mg/l and water flow 750 l/h. The final NRRL B-50141 spore concentration was approximately 1.8×10$^5$ CFU/ml in the aeration tank. The inoculant was allowed to disperse for 20-30 minutes, followed by water recirculation in the aeration tank for approximately 20 hours, or about 2.5 passes of the water through the membranes, in order to enhance the opportunity of the NRRL B-50141 inoculant to interact with the membrane. The ratio of added microbes to membrane surface area is thus approximately 3.5×10$^6$ CFU/cm$^2$.

The water level in the permeate tank of the MBR system was regulated to be under the water level in the membrane tank, resulting in a pressure difference over the membranes (TMP), driving the water through the membranes. The TMP was controlled at a relatively constant level in the interval of 250-300 mm water column by using pressure transmitters to control the influent flow. Air scouring was continuously employed to prevent buildup of sludge cake on the membrane. Further, flow through the membrane was stopped periodically, approximately 10 minutes of flow alternated with 2 minutes of no flow, to aid in the prevention of sludge and cake buildup.

Scraping samples were taken on or about day 190. During sampling, air scouring was stopped and the surface level of the MBR fluid was lowered to enable physical access to the upper part of the membranes. This was achieved by allowing part of the fluid into a storage tank. Subsequently, scrapings were taken of exposed membrane surfaces above the fluid surface on the side or the center portions of the membranes sampled, both before and after a short water flush of the membrane. Six scrapings (samples 1-6) corresponding to approximately 10 cm$^2$ of MBR membrane were placed into sterile screw-cap tubes and stored cold (4-10° C.) prior to microbial analysis.

The scraped material for each of the six samples was resuspended in a 0.1 M phosphate buffer at pH 7.0 and shaken in a standard wrist action shaker for 30 minutes at 23° C. Dilutions were plated by standard techniques on Standard Method Agar (SMA plates, Smith River Biologicals, Ferrum, Va., USA), and incubated for 2 days at 35° C.

An estimate of the percentage of cells recovered from the membrane scrapings was obtained by quantifying the number of colonies with the distinct NRRL B-50141 morphology compared with the number with different morphologies. MBR biofilm sample information, including the results from the analysis of samples 1-6 are shown in Table 4.

TABLE 4

| Sample Number and location | Approximate amount of NRRL B-50141 |
|---|---|
| 1) Before flush, membrane center | 1.2% |
| 2) Before flush, membrane side | 21.1% |
| 3) Before flush, membrane center | 4.5% |
| 4) Before flush, membrane center | 2.5% |
| 5) After H$_2$O flush | 16.5% |
| 6) After flush, membrane center | 6.6% |

Colonies from each of the samples with a morphology matching that of the NRRL B-50141 strain were isolated and assessed for identity to the known NRRL B-50141 parent strain by purifying DNA from each isolate and using the DiversaLab RAPD PCR-amplification procedure (Agilent 2100 Bioanalyzer with DiveraLab Strain typing software using the Bacillus Kit repPCR materials from bioMerieux, Inc., Durham, N.C., USA).

As detailed in Table 5, all 24 isolates chosen (four from each of the 6 scrapings taken) gave a strong match to the known parent NRRL B-50141 strain. A strain with a different colony type (control; Isolate 26) did not match NRRL B-50141 (i.e., it had less than 90% similarity).

TABLE 5

| Sample origin (Table 2) | Similarity to NRRL B-50141 | Match (>90%) Similarity |
|---|---|---|
| 1 | 94.5% | Match to NRRL B-50141 |
| 1 | 95.8% | Match to NRRL B-50141 |
| 1 | 95.9% | Match to NRRL B-50141 |
| 1 | 95.8% | Match to NRRL B-50141 |
| 2 | 94.9% | Match to NRRL B-50141 |
| 2 | 94.4% | Match to NRRL B-50141 |
| 2 | 95.4% | Match to NRRL B-50141 |
| 3 | 95.6% | Match to NRRL B-50141 |
| 3 | 95.4% | Match to NRRL B-50141 |
| 3 | 95.5% | Match to NRRL B-50141 |
| 4 | 95.7% | Match to NRRL B-50141 |
| 4 | 95.7% | Match to NRRL B-50141 |
| 4 | 96.6% | Match to NRRL B-50141 |
| 4 | 96.7% | Match to NRRL B-50141 |
| 5 | 96.5% | Match to NRRL B-50141 |
| 5 | 97.2% | Match to NRRL B-50141 |
| 5 | 97.0% | Match to NRRL B-50141 |
| 5 | 97.3% | Match to NRRL B-50141 |
| 5 | 96.8% | Match to NRRL B-50141 |
| 5 | 97.6% | Match to NRRL B-50141 |
| 6 | 96.6% | Match to NRRL B-50141 |
| 6 | 97.0% | Match to NRRL B-50141 |
| 6 | 96.8% | Match to NRRL B-50141 |
| Parent | 97.7% | Match to NRRL B-50141 |
| 3 | 84.2% | No-match |

Effect of NRRL B-50141on MBR Flux in Field Trial Assessments

The enhanced permeability rate was notably enhanced in the period after microbial inoculation (days 154-200), with a persistent permeability level averaging 400 l/m$^2$/hr/bar. This represents approximately a 33% increase in overall flow rate following the microbial inoculum compared with the reference period, i.e., days 105-152 (without the microbial inoculum) under virtually identical conditions of temperature and pressure (see FIG. 2).

Figure 2:
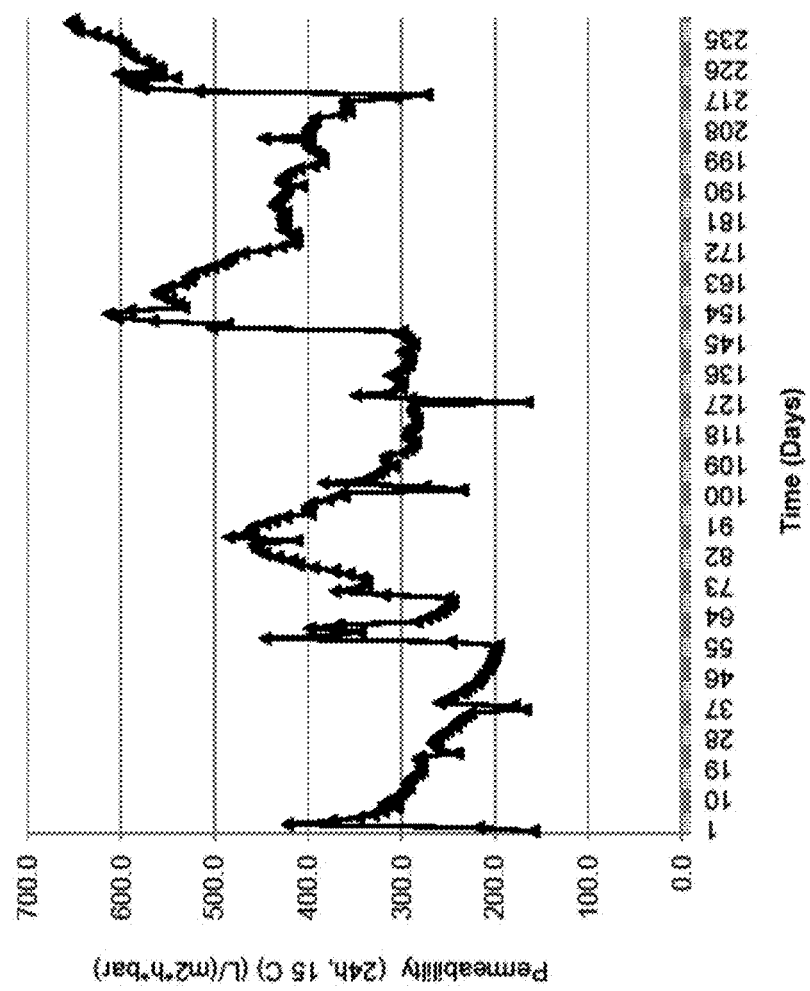
FIG. 2 shows the effect of NRRL B-50141 on membrane permeability over time.

The permeability shown in FIG. 2 is based on daily average net permeate flows corrected to a standard temperature of 15° C. using the following equation:

$$F_{15°\,C.} = F_{temp} * e^{(-0.0267*(T-15))}$$

wherein F is the flow (l/m$^2$*hr), T is the actual temperature, and permeability=F/pressure (bars).

Transmembrane pressure (TMP) was kept constant, and chemical and biochemical parameters were assessed daily throughout the reference and trial periods.

Second Inoculation of NRRL B-50141. MBR Membrane Colonization and Maintained Permeability Enhancement With Microbial Inoculation Without Recycling.

On or about day 195, NRRL B-50141 was again inoculated into the MBR tank, except that the water recirculation after the second inoculation was not performed. High permeability rates of about 375 l/m$^2$/hr/bar were maintained until day 212.

After approximately 26 days post-inoculation, on or about day 211, additional scrapings were collected and analyzed using the same procedures as described above. Results for percentage of colonies and strain identity are demonstrated in Tables 6 and 7. The presence of the inoculated strain (NRRL B-50141) in the membrane scrapings ranged from 7-52% of the total recovered microbial strains. The identity of the NRRL B-50141 strain was again confirmed by high homology sequence analysis of the 1500 by segment of the 16S rDNA of strains isolated with similar colony morphology on standard solid media. This verified the presence of the inoculated strain during the time of enhanced permeability across the membrane.

TABLE 6

| Sample number and location | Approximate amount of NRRL B-50141 |
|---|---|
| 1a) Membrane center | 42% |
| 2a) Membrane center | 52% |
| 3a) Membrane center | 13% |
| 4a) Membrane side | 17% |
| 5a) Membrane side | 7% |
| 6a) Membrane side | 50% |

TABLE 7

| Sample origin | Similarity to NRRL B-50141 | Match (>90%) Similarity |
|---|---|---|
| 1a | 98.9% | Match to NRRL B-50141 |
| 1a | 99.0% | Match to NRRL B-50141 |
| 2a | 98.8% | Match to NRRL B-50141 |
| 2a | 99.2% | Match to NRRL B-50141 |
| 3a | 98.8% | Match to NRRL B-50141 |
| 3a | 98.2% | Match to NRRL B-50141 |
| 4a | 98.5% | Match to NRRL B-50141 |
| 4a | 98.7% | Match to NRRL B-50141 |
| 5a | 98.5% | Match to NRRL B-50141 |
| 5a | 98.7% | Match to NRRL B-50141 |
| 6a | 98.1% | Match to NRRL B-50141 |
| 6a | 99.3% | Match to NRRL B-50141 |
| Parent | 100.0% | Match to NRRL B-50141 |

Example 5

Disruption of Genes of Interest in *Bacillus subtilis* Strain A164 (ATCC6051A) for MBR Antifouling Experiments.

The racX gene of *Bacillus subtilis* A164 (ATCC 6051A) was disrupted by replacement of most of the racX coding sequence with a gene conferring resistance to the antibiotic neomycin. The gene disruption was constructed in vitro using three-way SOE (splicing by overlap extension) PCR.

Three DNA fragments were amplified by PCR. A fragment comprising a region of DNA downstream of the *Bacillus subtilis* racX gene was amplified from *Bacillus subtilis* A164 genomic DNA using primers 0610964 and 0610965. A neomycin resistance gene (neo) was amplified from pBEST501 plasmid DNA (Itaya et al., 1989, *Nucl. Acids Res.* 17:4410) using primers 0610966 and 0610967. A fragment comprising a region of DNA upstream of the *Bacillus subtilis* racX gene was amplified from *Bacillus subtilis* A164 genomic DNA using primers 0610968 and 0610969.

```
Primer 0610964:
                                    (SEQ ID NO: 1)
5'-GGATTAACGAGGGCCAAC-3'

Primer 0610965:
                                    (SEQ ID NO: 2)
5'-AGAATTGATCTGCGGCACATATCTTGCTTATCAAAGCTAG-3'

Primer 0610966:
                                    (SEQ ID NO: 3)
5'-ATAAGCAAGATATGTGCCGCAGATCAATTCTGATAATTAC-3'

Primer 0610967:
                                    (SEQ ID NO: 4)
5'-ATCGACCTCGCCGTTTATAGGTCGAGATCAGGGAATG-3'

Primer 0610968:
                                    (SEQ ID NO: 5)
5'-CATTCCCTGATCTCGACCTATAAACGGCGAGGTCGAT-3'

Primer 0610969:
                                    (SEQ ID NO: 6)
5'-TGCAGCATATCATGGCGT-3'
```

The PCRs were performed using Phusion® Hot Start DNA Polymerase (New England Biolabs, Inc., Beverly, Mass., USA) according to the manufacturer's instructions in a PTC-200 Peltier thermal cycler (MJ Research, Inc., Waltham, Mass., USA) using the following temperature profile:
1 cycle of 96° C. for 2 minutes;
11 cycles of 94° C. for 30 seconds; 60° C. for 45 seconds, decreasing by 1° C. per cycle; and 72° C. for 1 minute;
20 cycles of 94° C. for 30 seconds; 50° C. for 45 seconds; and 72° C. for 1 minutes, increasing by 5 seconds per cycle;
1 cycle of 72° C. for 5 minutes.

Primers 0610965 and 0610966 were designed to base-pair with each other so that the downstream racX fragment could be fused to the neo fragment. Likewise, primers 0610967 and 0610968 were designed to base-pair with each other so that the neo fragment could be fused to the upstream racX fragment. The three PCR products were combined in a single SOE PCR to fuse them into a single PCR product, as follows.

The PCR products were purified using a QIAQUICK® Gel Extraction Kit (QIAGEN Inc., Valencia, Calif., USA) according to the manufacturer's instructions and used as template DNA in an SOE PCR using primers 0610964 and 0610969. The PCR was performed using Phusion® Hot Start DNA Polymerase according to the manufacturer's instructions in a PTC-200 Peltier thermal cycler using the following temperature profile:
1 cycle of 96° C. for 2 minutes;
11 cycles of 94° C. for 30 seconds; 60° C. for 45 seconds, decreasing by 1° C. per cycle; and 72° C. for 3 minutes;
20 cycles of 94° C. for 30 seconds; 50° C. for 45 seconds; and 72° C. for 3 minutes, increasing by 20 seconds per cycle;
1 cycle of 72° C. for 5 minutes.

The resulting racX::neo PCR product was purified using a QIAQUICK® Gel Extraction Kit according to the manufacturer's instructions. In order to generate a larger quantity of the PCR product, the purified racX::neo PCR was used as template DNA in a PCR using primers 0610964 and 0610969. The PCR was performed as described for the SOE PCR.

*Bacillus subtilis* A164 was transformed with the resulting PCR fragment according to the method of Anagnostopoulos and Spizizen (*J. Bacteriol.* 81:741-746 (1961)). Transformants were selected on TBAB neomycin plates at 37° C. TBAB medium was composed of Difco Tryptose Blood Agar Base (BD Diagnostics, Franklin Lakes, N.J., USA). TBAB neomycin plates were composed of TBAB medium and 6 micrograms of neomycin per ml. One such transformant was designated *Bacillus subtilis* MDT361. Disruption of the racX gene by insertion of the neo gene was confirmed by PCR and DNA sequencing.

The ylmE gene of *Bacillus subtilis* A164 was disrupted by replacement of most of the ylmE coding sequence with a gene conferring resistance to the antibiotic spectinomycin. The gene disruption was constructed in vitro using three-way SOE (splicing by overlap extension) PCR.

Three DNA fragments were amplified by PCR. A fragment comprising a region of DNA upstream of the *Bacillus subtilis* ylmE gene was amplified from *Bacillus subtilis*

A164 genomic DNA using primers 0610970 and 0610971. A spectinomycin resistance gene (spc) was amplified from pSJ5218 plasmid DNA (PCT Application WO 2002/000907) using primers 0610972 and 0610973. A fragment comprising a region of DNA downstream of the *Bacillus subtilis* ylmE gene was amplified from *Bacillus subtilis* A164 genomic DNA using primers 0610974 and 0610975.

```
Primer 0610970:
                                      (SEQ ID NO: 7)
5'-TATTGGGGAGGAAGTTGG-3'

Primer 0610971:
                                      (SEQ ID NO: 8)
5'-TTTCACAATTTGTCTACAGCGTAAATTATCAACAACACGC-3'

Primer 0610972:
                                      (SEQ ID NO: 9)
5'-TTGTTGATAATTTACGCTGTAGACAAATTGTGAAAGGATG-3'

Primer 0610973:
                                     (SEQ ID NO: 10)
5'-ACTAACGATGCCACTAATATTAATAAACTATCGAAGGAAC-3'

Primer 0610974:
                                     (SEQ ID NO: 11)
5'-TAGTTTATTAATATTAGTGGCATCGTTAGTCGGAAATGAA-3'

Primer 0610975:
                                     (SEQ ID NO: 12)
5'-CTTCAATCAGCATTTGGAAAC-3'
```

The PCRs were performed using Phusion® Hot Start DNA Polymerase according to the manufacturer's instructions in a PTC-200 Peltier thermal cycler using the following temperature profile:
1 cycle of 96° C. for 2 minutes;
11 cycles of 94° C. for 30 seconds; 60° C. for 45 seconds, decreasing by 1° C. per cycle; and 72° C. for 1 minute;
20 cycles of 94° C. for 30 seconds; 50° C. for 45 seconds; and 72° C. for 1 minute, increasing by 5 second per cycle;
1 cycle of 72° C. for 5 minutes.

Primers 0610971 and 0610972 were designed to base-pair with each other so that the upstream ylmE fragment could be fused to the spc fragment. Likewise, primers 0610973 and 0610974 were designed to base-pair with each other so that the spc fragment could be fused to the downstream ylmE fragment. The three PCR products were combined in a single SOE PCR to fuse them into a single PCR product, as follows.

The PCR products were purified using a QIAQUICK® Gel Extraction Kit according to the manufacturer's instructions and used as template DNA in an SOE PCR using primers 0610970 and 06109705. The PCR was performed using Phusion® Hot Start DNA Polymerase according to the manufacturer's instructions in a PTC-200 Peltier thermal cycler using the following temperature profile:
1 cycle of 96° C. for 2 minutes;
11 cycles of 94° C. for 30 seconds; 60° C. for 45 seconds, decreasing by 1° C. per cycle; and 72° C. for 3 minutes;
20 cycles of 94° C. for 30 seconds; 50° C. for 45 seconds; and 72° C. for 3 minutes, increasing by 5 seconds per cycle;
1 cycle of 72° C. for 5 minutes.

The resulting ylmE::spc PCR product was purified using a QIAQUICK® Gel Extraction Kit according to the manufacturer's instructions. In order to generate a larger quantity of the PCR product, the purified ylmE::spc PCR was used as template DNA in a PCR using primers 0610970 and 06109705. The PCR was performed as described for the SOE PCR.

*Bacillus subtilis* A164 was transformed with the resulting PCR fragment according to the method of Anagnostopoulos and Spizizen (*J. Bacteriol.* 81:741-746 (1961)). Transformants were selected on TBAB spectinomycin plates at 37° C. TBAB medium was composed of Difco Tryptose Blood Agar Base (BD Diagnostics, Franklin Lakes, N.J., USA). TBAB spectinomycin plates were composed of TBAB medium and 120 micrograms of spectinomycin per ml. One such transformant was designated *Bacillus subtilis* MDT362. Disruption of the ylmE gene by insertion of the spc gene was confirmed by PCR and DNA sequencing.

The transformant *Bacillus subtilis* MDT362 was transformed with genomic DNA from *Bacillus subtilis* MDT361 according to the method of Anagnostopoulos and Spizizen (*J. Bacteriol.* 81:741-746 (1961)). Transformants were selected on TBAB neomycin plates at 37° C. One such transformant was designated *Bacillus subtilis* MDT363. Disruption of the racX gene by insertion of the neo gene and disruption of the ylmE gene by insertion of the spc gene were confirmed by PCR and DNA sequencing.

Wild-type A164 and gene knockouts of the *B. subtilis* A164 were grown approximately 16 hours in 0.5× Lysogeny Broth (LB) with shaking at 200 rpm. After growth, culture density was determined by direct counting on a hemocytometer. Membrane discs were placed in filter holders and treated first with 100% isopropanol then with 10% sodium perchlorate. Membranes and holders were rinsed with sterile water then inoculated with 0.1× LB containing the strain to be tested at a rate of 100 cells×ml$^{-1}$ via syringe in a total volume of 1 ml and incubated at 25° C. with shaking at 250 RPM approximately 16 hours. Membranes were subsequently inoculated with *P. aeruginosa* strain PAO1 at a rate of 100 cells/ml$^{-1}$ in 1 ml of 0.1× LB and incubated overnight at 25° C. with shaking at 250 RPM. Media and planktonic cells were removed from the filter holders by aspirating the contents with a syringe. Flow rates were subsequently determined by placing the treated and untreated filters on individual ports of a vacuum manifold with a syringe containing 3 ml of phosphate buffered saline (PBS) and applying −2.0 bar vacuum for 5 minutes. Filtrate was recovered for each filter separately and flow-through volume was determined gravimetrically. Data presented is the mean volume of flow-through ±1 standard deviation. See Table 8. Significant differences in flow-through volume were observed for the yFlnD disruption mutant as well as the dual racemace knockout, racX+ylmE. Strains were tested in triplicate, both unchallenged and challenged with PAO1 as a biofilm-forming strain

TABLE 8

| Strain | No PAO1 | With PAO1 |
|---|---|---|
| A164 (Wild-type) | 1217.33 ± 55.42 | 1145.67 ± 36.37 |
| A164 ΔracX + ΔylmE (MDT 363) | 1232.67 ± 66.90 | 1061.33 ± 67.34 |
| A164 ΔracX (MDT361) | 1261.00 ± 41.38 | 1091.67 ± 127.38 |
| A164 ΔylmE (MDT362) | 1240.33 ± 36.43 | 1091.00 ± 46.11 |

Example 6

Dual-Track Large-Scale Laboratory Test of *Bacillus subtilis* NRRL B-50136.

MBR membrane flux effect and colonization with microbial inoculation compared with a parallel non-inoculated MBR membrane.

Figure 3:
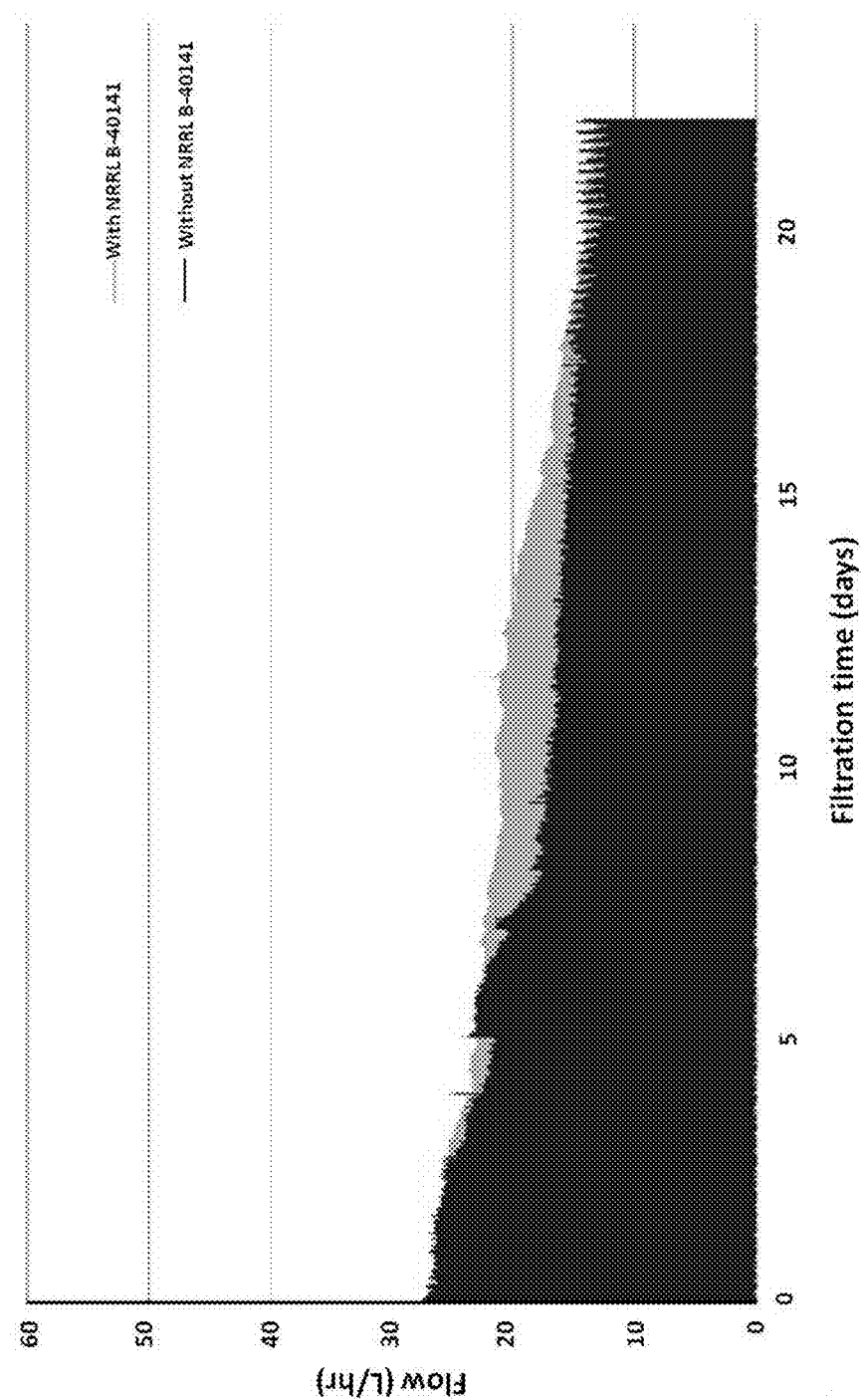
FIG. 3 shows the effect of NRRL B-50141 on membrane permeability over time.

The setup of the MBR system utilized in this example is described in FIG. 3. For clarity only one of two identical MBR units is drawn. The process parameters for the MBRs of Example 6 are disclosed in Table 9.

The applied flat sheet membranes are PVDF microfiltration membranes, average poresize of 0.2 micro-m, manufactured by Alfa Laval A/S. The membranes are stacked in a cassette of 10 membranes—the effective membrane area in the current tests was 0.8 $m^2$. The reactors are both aerobic with a constant aeration for membrane scouring of 10 L/min·$m^2$. Along the side of the reactor, aeration (20 L/min total) was likewise established to avoid sedimentation and secure complete mixing of the reactors.

The transmembrane pressure (TMP) is established as the difference in water level of the membrane reactor and the permeate buffer system. The effective TMP applied was 30 mbar (without the pressure drop of the flow meter and permeate system). Two minutes of relaxation was applied after each ten minutes of filtration by stopping the pump activity. The reactors were initially inoculated with activated sludge from Aalborg East WWTP (waste water treatment plant) and acclimatized for about a month before one the MBRs was inoculated with *Bacillus subtilis* NRRL B-50136 at the same rate and concentration as that described in Example 4 for NRRL B-50141. Sludge was taken out on a daily basis to keep a constant MLSS of 10 g/L. This sludge removal resulted in a sludge age (SRT) of 25-30 days.

TABLE 9

| Parameter {unit} | Value | Parameter {unit} | Value |
| --- | --- | --- | --- |
| Reactor Volume {$m^3$} | 0.35 | MLSS {g/L} | 10 |
| Membrane area {$m^2$} | 0.8 | MLVSS {g/L} | 9 |
| Membrane material | PVDF | SRT {days} | 25-30 |
| Avg. Poresize {micro-m} | 0.2 | HRT {days} | 0.9-1 |
| Scouring air {L/min · $m^2$} | 10 | F/M | 0.07 |
| Mixing air {L/min} | 20 | {kg BOD/kg MLSS · day} | |
| TMP {mBar} | 30 | F/M | 0.12 |
| Relaxation {min/min} | 2/10 | {kg COD/kg MLSS · day} | |
| | | Bulk pH | 7.6 |
| | | Bulk Conductivity {mS/cm} | 0.61 |
| | | Bulk Temperature {deg. C.} | 20.5 |

The wastewater was composed of a mixture of tap water and concentrated substrate. The tap water inlet is controlled by a float valve in the inlet buffer tank. Concentrated substrate was added from a separate input line and the addition was controlled after a F/M ratio set point of 0.1 kg BOD/kg MLSS·day. The concentrated substrate was a standard commercial dog feed which is mixed with demineralized water, blended and sedimented to remove larger particles and fibers before addition. In addition, fine commercial fish meal was added to the substrate mixture to increase the total protein contents. The concentrated substrate composition is disclosed in Table 10.

TABLE 10

| Parameter {unit} | Value |
| --- | --- |
| Organic fraction | 90% |
| Proteins (% of organic) | 50% |
| Carbohydrates (% of organic) | 40% |
| Fats (% of organic) | 10% |
| Total N {mg/L} | 57.8 |
| NH4-N {mg/L} | 14 |
| NO3-N {mg/L} | 4.4 |
| Total P {mg/L} | 92.5 |
| o-PO4-P {mg/L} | 81.2 |

Figure 4:
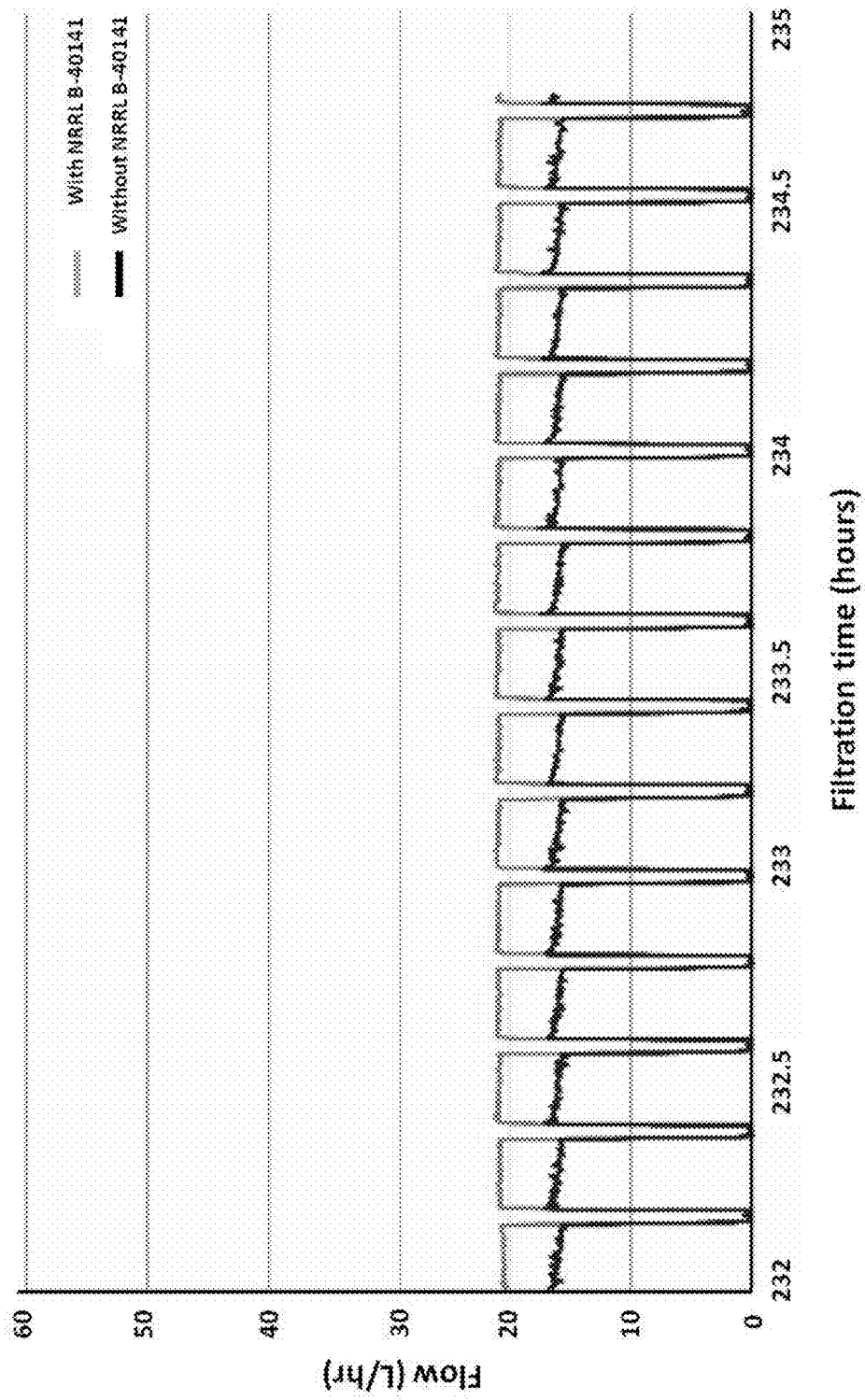
FIG. 4 shows the effect of relaxation events on membranes with or without treatment with NRRL B-50141.

The full results from the 18-Day test period are provided in FIG. 3. The results show that after an initial period of approximately 5 days of operation the flow rate of the untreated reactor decreased rapidly while the reactor treated with NRRL B-50141 maintained a higher flow rate from this point until approximately 18 days of operation. At approximately Day 10.5 post-inoculation, the MBR reactor treated with *Bacillus subtilis* NRRL B-50136 exhibited a 34% greater flow than the untreated reactor. A closer view of representative data from a 3-hr period approximately 9 days post-inoculation is provided in FIG. 4. The regular pump relaxation events, a standard practice for MBR operation, lasted for 2 minutes each and occurred at 10 minute intervals. Results show that in the untreated MBR reactor relaxation events result in a temporary increase immediately followed by a drop in flow rate whereas in the treated reactor a higher flow rate is maintained regardless of relaxation events. These results indicate that the treated reactor membranes are less impacted by fouling than the membranes in the untreated reactor.

The present invention is described by the following numbered paragraphs:

1. A method of improving the permeability of a membrane used in a process or the flux through a membrane used in a process, comprising subjecting the membrane to one or more microorganisms capable of reducing or preventing undesirable biofilm formation on the membrane.
2. The method of paragraph 1, wherein microorganisms includes one or more bacterial strains capable of reducing or preventing undesirable biofilm formation on the membrane.
3. The method of paragraph 1, wherein the one or more microorganisms are spore forming microorganisms capable of reducing or preventing undesirable biofilm formation on the membrane.
4. The method of paragraph 2, wherein the one or more bacterial strains are spore forming bacterial strains capable of reducing or preventing undesirable biofilm formation on the membrane.
5. The method of paragraphs 1, wherein microorganisms includes one or more bacterial strains, one or more fungal strains, or a mixture of one or more bacterial and fungal strains capable of reducing or preventing undesirable biofilm formation on the membrane.
6. The method of paragraphs 1-5, wherein the membrane is subjected to a strain of *Bacillus* spp., e.g., *Bacillus amyloliquefaciens; Bacillus atrophaeus; Bacillus azotoformans; Bacillus brevis; Bacillus cereus; Bacillus circulans; Bacillus clausii; Bacillus coagulans; Bacillus firmus; Bacillus flexus; Bacillus fusiformis; Bacillus globisporus; Bacillus glucanolyticus; Bacillus infernus; Bacillus laevolacticus; Bacillus licheniformis; Bacillus marinus; Bacillus megaterium; Bacillus mojavensis; Bacillus mycoides; Bacillus pallidus; Bacillus parabrevis; Bacillus pasteurii; Bacillus polymyxa; Bacillus popiliae; Bacillus pumilus; Bacillus sphaericus; Bacillus subtilis; Bacillus thermoamylovorans;* or *Bacillus thuringiensis.*
7. The method of paragraphs 1-6, wherein the membrane is subjected to a strain of *Bacillus amyloliquefaciens* or *Bacillus subtilis.*
8. The method of any of paragraphs 1-7, wherein the membrane is subjected to a strain of *Brevibacillus* spp., e.g., *Brevibacillus brevis; Brevibacillus formosus; Brevibacillus laterosporus;* or *Brevibacillus parabrevis.*
9. The method of any of paragraphs 1-8, wherein the membrane is subjected to a strain of *Paenibacillus* spp., e.g., *Paenibacillus alvei; Paenibacillus amylolyticus;*

*Paenibacillus azotofixans; Paenibacillus cookii; Paenibacillus macerans; Paenibacillus polymyxa;* or *Paenibacillus validus.*

10. The method of any of paragraphs 1-9, wherein the membrane is subjected to a strain of *Rhodococcus* spp., e.g., *Rhodococcus coprophilus; Rhodococcus erythropolis; Rhodococcus marinonascens; Rhodococcus rhodochrous; Rhodococcus ruber,* or *Rhodococcus zopfii.*

11. The method of any of paragraphs 1-10, wherein the membrane is subjected to a strain of *Escherichia* spp., e.g., *Escherichia albertii; Escherichia blattae; Escherichia coli; Escherichia fergusonii; Escherichia hermannii;* or *Escherichia vluneris.*

12. The method of any of paragraphs 1-11, wherein the membrane is subjected to a strain of *Enterobacter* spp., e.g., *Enterobacter cloacae; Enterobacter dissolvens; Enterobacter gergoviae; Enterobacter nimipressuralis;* or *Enterobacter pyrinus.*

13. The method of any of paragraphs 1-12, wherein the membrane is subjected to a strain of *Citrobacter* spp., e.g., *Citrobacter amalonaticus; Citrobacter koseri;* or *Citrobacter freundii.*

14. The method of any of paragraphs 1-13, wherein the membrane is subjected to a strain of *Salmonella* spp., e.g., *Salmonella bongori;* or *Salmonella enterica.*

15. The method of any of paragraphs 1-14, wherein the membrane is subjected to a strain of *Penicillium* spp., e.g., *Penicillium aurantiogriseum; Penicillium bilaiae; Penicillium camemberti; Penicillium candidum; Penicillium chrysogenum; Penicillium claviforme; Penicillium commune; Penicillium crustosum; Penicillium digitatum; Penicillium expansum; Penicillium funiculosum; Penicillium glabrum; Penicillium glacum; Penicillium italicum; Penicillium lacussarmientei; Penicillium marneffei; Penicillium purpurogenum; Penicillium roqueforti; Penicillium stoloniferum; Penicillium ulaiense; Penicillium verrucosum;* or *Penicillium viridicatum.*

16. The method of any of paragraphs 1-15, wherein the improved flux allows for the use of a membrane apparatus with a smaller cross-sectional area while maintaining required optimal wastewater flow and volume as provided by the former larger system.

17. The method of any of paragraphs 1-16, wherein the improved flux allows for the use of a membrane having a smaller membrane surface area.

18. The method of any of paragraphs 1-17, wherein the membrane is part of a membrane bioreactor system.

19. The method of any of paragraphs 1-18, wherein the process is a water treatment process.

20. The method of paragraph 19, wherein the water treatment process is a wastewater treatment process.

21. The method of any of paragraphs 1-20, wherein the one or more micoroorganisms are capable of preventing or reducing biofilm formation through quorum sensing inhibition.

22. The method of any of paragraphs 1-21, wherein the one or more bacterial strains are capable of preventing or reducing biofilm formation through quorum sensing inhibition.

23. The method of any of paragraphs 1-22, wherein the one or more bacterial strains are selected from strains of the genus *Bacillus.*

24. The method of paragraph 6, wherein the one or more strains of *Bacillus* are selected from the group consisting of:
the *Bacillus megaterium* strain having the deposit accession number ATCC 14581;
the *Bacillus pumilus* strain having the deposit accession number ATCC 700385;
the *Paenibacillus azotofixans* strain having the deposit accession number ATCC 35681;
the *Bacillus licheniformis* strain having the deposit accession number NRRL B-50014;
the *Bacillus licheniformis* strain having the deposit accession number NRRL B-50015;
the *Bacillus pumilus* strain having the deposit accession number NRRL B-50016;
the *Bacillus subtilis* strain having the deposit accession number ATCC 6051A;
the *Bacillus amyloliquefaciens* strain having the deposit accession number NRRL B-50017;
the *Bacillus amyloliquefaciens* strain having the deposit accession number NRRL B-50018;
the *Bacillus subtilis* strain having the deposit accession number NRRL B-50136;
the *Bacillus amyloliquefaciens* strain having the deposit accession number NRRL B-50141;
the *Bacillus amyloliquefaciens* strain having the deposit accession number NRRL B-50304;
the *Bacillus amyloliquefaciens* strain having the deposit accession number NRRL B-50349;
the *Bacillus megaterium* strain having the deposit accession number PTA-3142;
the *Bacillus amyloliquefaciens* strain having the deposit accession number PTA-7541;
the *Bacillus amyloliquefaciens* strain having the deposit accession number PTA-7542;
the *Bacillus atrophaeus* strain having the deposit accession number PTA-7543;
the *Bacillus amyloliquefaciens* strain having the deposit accession number PTA-7544;
the *Bacillus amyloliquefaciens* strain having the deposit accession number PTA-7545;
the *Bacillus amyloliquefaciens* strain having the deposit accession number PTA-7546;
the *Bacillus subtilis* strain having the deposit accession number PTA-7547;
the *Bacillus amyloliquefaciens* strain having the deposit accession number PTA-7549;
the *Bacillus amyloliquefaciens* strain having the deposit accession number PTA-7790;
the *Bacillus amyloliquefaciens* strain having the deposit accession number PTA-7791;
the *Bacillus atrophaeus* strain having the deposit accession number PTA-7792; and
the *Bacillus amyloliquefaciens* strain having the deposit accession number PTA-7793; or a mixture of two or more of the strains.

25. The method of any of paragraphs 1-24, wherein the one or more bacterial strains are introduced to the membrane at a final concentration of $1 \times 10^3$-$1 \times 10^{11}$ CFU/ml.

26. The method of any of paragraphs 1-25, wherein the one or more bacterial strains are introduced to the membrane at a final concentration of $1 \times 10^4$-$1 \times 10^{11}$ CFU/cm$^2$.

27. The method of any of paragraphs 1-26, wherein the membrane is subjected to one or more bacterial strains for about 1 minute to about 2 days before the membrane is subjected to the process that the membrane is used in.

28. The method of any of paragraphs 18-27, wherein the membrane bioreactor is a submerged or immersed process configuration.

29. The method of any of paragraphs 18-29, wherein the wastewater is from an industrial or agricultural process.

30. A method of increasing critical flux of a membrane used in a process, comprising subjecting the membrane to one or more microorganisms capable of reducing or preventing undesirable biofilm formation on the membrane.
31. The method of paragraph 30, wherein microorganisms includes one or more bacterial strains, capable of reducing or preventing undesirable biofilm formation on the membrane.
32. The method of paragraph 30, wherein the one or more microorganisms are spore forming microorganisms capable of reducing or preventing undesirable biofilm formation on the membrane.
33. The method of paragraph 31, wherein the one or more bacterial strains are spore forming bacterial strains capable of reducing or preventing undesirable biofilm formation on the membrane.
34. The method of paragraph 30, wherein microorganisms includes one or more bacterial strains, one or more fungal strains, or a mixture of one or more bacterial and fungal strains capable of reducing or preventing undesirable biofilm formation on the membrane.
35. The method of paragraph 30, wherein the membrane is part of a membrane bioreactor system.
36. The method of paragraph 30 or 35, wherein the process is a water treatment process.
37. The method of paragraph 36 wherein the water treatment process is a wastewater treatment process.
38. The method of any of paragraphs 30-37, wherein the one or more microorganisms are capable of preventing or reducing biofilm formation through quorum sensing inhibition.
39. The method of any of paragraphs 30-38, wherein the one or more bacterial strains are selected from strains of the genus *Bacillus*.
40. The method of any of paragraphs 30-39, wherein the one or more bacterial strains are introduced to the membrane at a final concentration of $1 \times 10^3$-$1 \times 10^{11}$ CFU/ml.
41. The method of any of paragraphs 30-40, wherein the one or more bacterial strains are introduced to the membrane at a final concentration of $1 \times 10^4$-$1 \times 10^{11}$ CFU/cm$^2$.
42. The method of any of paragraphs 30-41, wherein the membrane is subjected to one or more bacterial strains for about 1 minute to about 2 days before the membrane is subjected to the process.
43. The method of any of paragraphs 30-42, wherein the membrane bioreactor is a submerged or immersed process configuration.
44. The method of any of paragraphs 30-43, wherein the wastewater is from an industrial or agricultural process.
45. A method of reducing or preventing fouling of a membrane used in a process, comprising subjecting the membrane to one or more microorganisms capable of reducing or preventing undesirable biofilm formation on the membrane.
46. The method of paragraph 45, wherein microorganisms includes one or more bacterial strains capable of reducing or preventing undesirable biofilm formation on the membrane.
47. The method of paragraph 45, wherein the one or more microorganisms are spore forming microorganisms capable of reducing or preventing undesirable biofilm formation on the membrane.
48. The method of paragraph 46, wherein the one or more bacterial strains are spore forming bacterial strains capable of reducing or preventing undesirable biofilm formation on the membrane.
49. The method of paragraph 45, wherein microorganisms includes one or more bacterial strains, one or more fungal strains, or a mixture of one or more bacterial and fungal strains capable of reducing or preventing undesirable biofilm formation on the membrane.
50. The method of paragraph 45, wherein the membrane is part of a membrane bioreactor system.
51. The method of paragraph 45 or 50, wherein the process is a water treatment process.
52. The method of paragraph 51, wherein the water treatment process is a wastewater treatment process.
53. The method of any of paragraphs 45-52, wherein the one or more microorganisms are capable of preventing or reducing biofilm formation through quorum sensing inhibition.
54. The method of any of paragraphs 45-53, wherein the one or more bacterial strains are capable of preventing or reducing biofilm formation through quorum sensing inhibition.
55. The method of any of paragraphs 45-54, wherein the one or more bacterial strains are selected from strains of the genus *Bacillus*.
56. The method of any of paragraphs 45-55, wherein the one or more bacterial strains are introduced to the membrane at a final concentration of $1 \times 10^3$-$1 \times 10^{11}$ CFU/ml.
57. The method of any of paragraphs 45-56, wherein the one or more bacterial strains are introduced to the membrane at a final concentration of $1 \times 10^4$-$1 \times 10^{11}$ CFU/cm$^2$.
58. A method of improving the permeability of a membrane used in a process or the flux through a membrane used in a process, comprising adding to the membrane one or more microorganisms capable of reducing or preventing undesirable biofilm formation on the membrane.
59. A method of increasing critical flux of a membrane used in a process, comprising adding to the membrane one or more microorganisms capable of reducing or preventing undesirable biofilm formation on the membrane.
60. A method of reducing or preventing fouling of a membrane used in a process, comprising adding to the membrane one or more microorganisms capable of reducing or preventing undesirable biofilm formation on the membrane.
61. The method of any of paragraphs 45-60, wherein the membrane is subjected to one or more bacterial strains for about 1 minute to about 2 days before the membrane is subjected to the process.
62. The method of any of paragraphs 45-61, wherein the membrane bioreactor is a submerged or immersed process configuration.
63. The method of any of paragraphs 45-62, wherein the wastewater is from an industrial or agricultural process.
64. A method of improving MBR system capacity comprising a method of any of paragraphs 1-63.
65. A method for reducing the membrane surface area of an MBR system comprising a method of any of paragraphs 1-64.
66. A method for reducing the cost of manufacturing a MBR system comprising a method of any of paragraphs 1-65.
67. A method for reducing the number of membranes within a MBR system comprising a method of any of paragraphs 1-66.
68. A composition for the use in membrane filtration systems comprising one or more microorganisms capable of reducing or preventing undesirable biofilm formation, and one or more additional ingredients.

69. The composition of paragraph 68, wherein microorganisms includes one or more bacterial strains capable of reducing or preventing undesirable biofilm formation.
70. The composition of paragraph 68, wherein the one or more microorganisms are spore forming microorganisms capable of reducing or preventing undesirable biofilm formation on the membrane.
71. The composition of paragraph 68, wherein the one or more bacterial strains are spore forming bacterial strains capable of reducing or preventing undesirable biofilm formation on the membrane.
72. The composition of paragraph 68, wherein microorganisms includes one or more bacterial strains, one or more fungal strains, or a mixture of one or more bacterial and fungal strains capable of reducing or preventing undesirable biofilm formation.
73. The composition of paragraphs 1-72, wherein the microorganisms are capable of preventing or reducing biofilm formation through quorum sensing inhibition.
74. The composition of paragraphs 1-73, wherein the microorganisms are capable of preventing or reducing biofilm formation by converting L-tyrosine to D-tyrosine through the expression of one or more racemases.
75. The composition of paragraphs 1-74, wherein the microorganisms are capable of preventing or reducing biofilm formation by converting L-tyrosine to D-tyrosine through the expression of a ylmE racemase.
76. The composition of paragraphs 1-75, wherein the microorganisms are capable of preventing or reducing biofilm formation by converting L-tyrosine to D-tyrosine through the expression of a racX racemase.
77. The composition of paragraphs 1-76, wherein the one or more additional ingredients includes surfactants, enzymes, or a combination thereof.
78. A filtration system comprising:
an inlet coupled to an outlet having at least one membrane disposed therebetween; and
one or more microorganisms, wherein the one or more microorganisms selected for addition to the filtration system are one or more microorganisms capable of reducing or preventing undesirable biofilm formation on the membrane.
79. The system of paragraph 78, wherein the membrane is a flat sheet microfiltration membrane.
80. The system of any of paragraphs 78-79, wherein the membrane is a polyvinylidene fluoride (PVDF) membrane or a polyethylsulphone (PES) membrane.
81. The system of paragraph 79-80, wherein the membrane is part of a membrane bioreactor system.
82. The system of any of paragraphs 79-81, wherein the membrane bioreactor is a submerged or immersed system configuration.
83. The system of paragraph 79-82, wherein the system is a water treatment system.
84. The system of paragraph 79-83, wherein the water treatment system is a wastewater treatment system.
85. The system of any of paragraphs 79-84, wherein the wastewater is from an industrial or agricultural process.
86. The system of paragraphs 79-85, wherein the one or more microorganisms capable of reducing or preventing undesirable biofilm formation on the membrane decreases the total surface area of the membranes necessary for the operation of the system.
87. The system of paragraph 79-86, wherein the one or more microorganisms capable of reducing or preventing undesirable biofilm formation on the membrane decreases the total number of membranes necessary for the operation of the system.
88. The system of paragraphs 79-87, wherein microorganisms includes one or more bacterial strains, capable of reducing or preventing undesirable biofilm formation on the membrane.
89. The system of paragraphs 79-88, wherein the one or more microorganisms are spore forming microorganisms capable of reducing or preventing undesirable biofilm formation on the membrane.
90. The system of paragraphs 79-89, wherein the one or more bacterial strains are spore forming bacterial strains capable of reducing or preventing undesirable biofilm formation on the membrane.
91. The system of paragraphs 79-90, wherein microorganisms includes one or more bacterial strains, one or more fungal strains, or a mixture of one or more bacterial and fungal strains capable of reducing or preventing undesirable biofilm formation on the membrane.
92. The system of paragraphs 79-91, wherein the includes a strain of *Bacillus* spp., e.g., *Bacillus amyloliquefaciens; Bacillus atrophaeus; Bacillus azotoformans; Bacillus brevis; Bacillus cereus; Bacillus circulans; Bacillus clausii; Bacillus coagulans; Bacillus firmus; Bacillus flexus; Bacillus fusiformis; Bacillus globisporus; Bacillus glucanolyticus; Bacillus infermus; Bacillus laevolacticus; Bacillus licheniformis; Bacillus marinus; Bacillus megaterium; Bacillus mojavensis; Bacillus mycoides; Bacillus pallidus; Bacillus parabrevis; Bacillus pasteurii; Bacillus polymyxa; Bacillus popiliae; Bacillus pumilus; Bacillus sphaericus; Bacillus subtilis; Bacillus thermoamylovorans;* or *Bacillus thuringiensis.*
93. The system of paragraphs 79-92, wherein the membrane includes a strain of *Bacillus amyloliquefaciens* or *Bacillus subtilis.*
94. The system of paragraphs 79-93, wherein the system includes a strain of *Brevibacillus* spp., e.g., *Brevibacillus brevis; Brevibacillus formosus; Brevibacillus laterosporus;* or *Brevibacillus parabrevis.*
95. The system of paragraphs 79-94, wherein the system includes a strain of *Paenibacillus* spp., e.g., *Paenibacillus alvei; Paenibacillus amylolyticus; Paenibacillus azotofixans; Paenibacillus cookii; Paenibacillus macerans; Paenibacillus polymyxa;* or *Paenibacillus validus.*
96. The system of paragraphs 79-95, wherein the system includes a strain of *Rhodococcus* spp., e.g., *Rhodococcus coprophilus; Rhodococcus erythropolis; Rhodococcus marinonascens; Rhodococcus rhodochrous; Rhodococcus ruber,* or *Rhodococcus zopfii.*
97. The system of paragraphs 79-96, wherein the system includes a strain of *Escherichia* spp., e.g., *Escherichia albertii; Escherichia blattae; Escherichia coli; Escherichia fergusonii; Escherichia hermannii;* or *Escherichia vluneris.*
98. The system of paragraphs 79-97, wherein the system includes a strain of *Enterobacter* spp., e.g., *Enterobacter cloacae; Enterobacter dissolvens; Enterobacter gergoviae; Enterobacter nimipressuralis;* or *Enterobacter pyrinus.*
99. The system of paragraphs 79-98, wherein the system includes a strain of *Citrobacter* spp. e.g., *Citrobacter amalonaticus; Citrobacter koseri;* or *Citrobacter freundii.*
100. The system of paragraphs 79-99, wherein the system includes a strain of *Salmonella* spp., e.g., *Salmonella bongori;* or *Salmonella enterica.*
101. The system of paragraphs 79-100, wherein the system includes a strain of *Penicillium* spp., e.g., *Penicillium aurantiogriseum; Penicillium bilaiae; Penicillium cambembert; Penicillium candidum; Penicillium chrysoge-* num; *Penicillium claviforme*; *Penicillium commune*; *Penicillium crustosum*; *Penicillium digitatum*; *Penicillium expansum*; *Penicillium funiculosum*; *Penicillium glabrum*; *Penicillium glacum*; *Penicillium italicum*; *Penicillium lacussarmientei*; *Penicillium mameffei*; *Penicillium purpurogenum*; *Penicillium roqueforti*; *Penicillium stoloniferum*; *Penicillium ulaiense*; *Penicillium verrucosum*; or *Penicillium viridicatum*.

102. The system of paragraph 92, wherein the one or more strains of *Bacillus* are selected from the group consisting of:

the *Bacillus megaterium* strain having the deposit accession number ATCC 14581;

the *Bacillus pumilus* strain having the deposit accession number ATCC 700385;

the *Paenibacillus azotofixans* strain having the deposit accession number ATCC 35681;

the *Bacillus licheniformis* strain having the deposit accession number NRRL B-50014;

the *Bacillus licheniformis* strain having the deposit accession number NRRL B-50015;

the *Bacillus pumilus* strain having the deposit accession number NRRL B-50016;

the *Bacillus subtilis* strain having the deposit accession number ATCC 6051A;

the *Bacillus amyloliquefaciens* strain having the deposit accession number NRRL B-50017;

the *Bacillus amyloliquefaciens* strain having the deposit accession number NRRL B-50018;

the *Bacillus subtilis* strain having the deposit accession number NRRL B-50136;

the *Bacillus amyloliquefaciens* strain having the deposit accession number NRRL B-50141;

the *Bacillus amyloliquefaciens* strain having the deposit accession number NRRL B-50304;

the *Bacillus amyloliquefaciens* strain having the deposit accession number NRRL B-50349;

the *Bacillus megaterium* strain having the deposit accession number PTA-3142;

the *Bacillus amyloliquefaciens* strain having the deposit accession number PTA-7541;

the *Bacillus amyloliquefaciens* strain having the deposit accession number PTA-7542;

the *Bacillus atrophaeus* strain having the deposit accession number PTA-7543;

the *Bacillus amyloliquefaciens* strain having the deposit accession number PTA-7544;

the *Bacillus amyloliquefaciens* strain having the deposit accession number PTA-7545;

the *Bacillus amyloliquefaciens* strain having the deposit accession number PTA-7546;

the *Bacillus subtilis* strain having the deposit accession number PTA-7547;

the *Bacillus amyloliquefaciens* strain having the deposit accession number PTA-7549;

the *Bacillus amyloliquefaciens* strain having the deposit accession number PTA-7790;

the *Bacillus amyloliquefaciens* strain having the deposit accession number PTA-7791;

the *Bacillus atrophaeus* strain having the deposit accession number PTA-7792; and the *Bacillus amyloliquefaciens* strain having the deposit accession number PTA-7793; or a mixture of two or more of the strains.

The invention described and claimed herein is not to be limited in scope by the specific aspects herein disclosed, since these aspects are intended as illustrations of several aspects of the invention. Any equivalent aspects are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control.

What is claimed is:

1. A method of improving the permeability of a membrane used in a waste water treatment process, the method comprising subjecting the membrane to an effective amount of one or more bacterial strains capable of reducing or preventing undesirable biofilm formation on the membrane, wherein the one or more bacterial strains is selected from the *Bacillus subtilis* strain having the deposit accession number NRRL B-50136, the *Bacillus amyloliquefaciens* strain having the deposit accession number NRRL B-50141 and the *Paenibacillus azotofixans* strain having the deposit accession number ATCC 35681.

2. The method of claim 1, wherein the one or more bacterial strains are spore forming bacterial strains capable of reducing or preventing undesirable biofilm formation on the membrane.

3. The method of claim 1, wherein the one or more bacterial strains are capable of preventing or reducing biofilm formation through quorum sensing inhibition.

4. The method of claim 1, wherein the improved flux allows for the use of a membrane having a smaller membrane surface area.

5. The method of claim 1, wherein the membrane is part of a membrane bioreactor system.

6. The method of claim 1, wherein the one or more bacterial strains are introduced to the membrane at a final concentration of $1 \times 10^3 - 1 \times 10^{10}$ CFU/ml.

7. The method of claim 1, wherein the one or more bacterial strains are introduced to the membrane at a final concentration of $1 \times 10^4 - 1 \times 10^{11}$ CFU/cm$^2$.

8. The method of claim 1, wherein the membrane is subjected to one or more bacterial strains for about 1 minute to about 2 days before the membrane is subjected to the process that the membrane is used in.

9. The method of any of claim 1, wherein the membrane bioreactor is a submerged or immersed process configuration.

10. The method of any of claim 1, wherein the wastewater is from an industrial or agricultural process.

* * * * *

SEQUENCE LISTING

```
<160> NUMBER OF SEQ ID NOS: 12

<210> SEQ ID NO 1
<211> LENGTH: 18
<212> TYPE: DNA
<213> ORGANISM: Bacillus subtilis

<400> SEQUENCE: 1
ggattaacga gggccaac                                                  18

<210> SEQ ID NO 2
<211> LENGTH: 40
<212> TYPE: DNA
<213> ORGANISM: Bacillus subtilis

<400> SEQUENCE: 2
agaattgatc tgcggcacat atcttgctta tcaaagctag                          40

<210> SEQ ID NO 3
<211> LENGTH: 40
<212> TYPE: DNA
<213> ORGANISM: Bacillus subtilis

<400> SEQUENCE: 3
ataagcaaga tatgtgccgc agatcaattc tgataattac                          40
```

```
<210> SEQ ID NO 4
<211> LENGTH: 37
<212> TYPE: DNA
<213> ORGANISM: Bacillus subtilis

<400> SEQUENCE: 4
atcgacctcg ccgtttatag gtcgagatca gggaatg                              37

<210> SEQ ID NO 5
<211> LENGTH: 37
<212> TYPE: DNA
<213> ORGANISM: Bacillus subtilis

<400> SEQUENCE: 5
cattccctga tctcgaccta taaacggcga ggtcgat                              37

<210> SEQ ID NO 6
<211> LENGTH: 18
<212> TYPE: DNA
<213> ORGANISM: Bacillus subtilis

<400> SEQUENCE: 6
tgcagcatat catggcgt                                                    18

<210> SEQ ID NO 7
<211> LENGTH: 18
<212> TYPE: DNA
<213> ORGANISM: Bacillus subtilis

<400> SEQUENCE: 7
tattggggag gaagttgg                                                    18

<210> SEQ ID NO 8
<211> LENGTH: 40
<212> TYPE: DNA
<213> ORGANISM: Bacillus subtilis

<400> SEQUENCE: 8
tttcacaatt tgtctacagc gtaaattatc aacaacacgc                            40

<210> SEQ ID NO 9
<211> LENGTH: 40
<212> TYPE: DNA
<213> ORGANISM: Bacillus subtilis

<400> SEQUENCE: 9
ttgttgataa tttacgctgt agacaaattg tgaaaggatg                            40

<210> SEQ ID NO 10
<211> LENGTH: 40
<212> TYPE: DNA
<213> ORGANISM: Bacillus subtilis

<400> SEQUENCE: 10
actaacgatg ccactaatat taataaacta tcgaaggaac                            40

<210> SEQ ID NO 11
<211> LENGTH: 40
<212> TYPE: DNA
<213> ORGANISM: Bacillus subtilis

<400> SEQUENCE: 11
tagtttatta atattagtgg catcgttagt cggaaatgaa                            40
```

```
<210> SEQ ID NO 12
<211> LENGTH: 21
<212> TYPE: DNA
<213> ORGANISM: Bacillus subtilis

<400> SEQUENCE: 12
cttcaatcag catttggaaa c                                              21
```